(12) United States Patent
Morise

(10) Patent No.: US 11,454,319 B2
(45) Date of Patent: Sep. 27, 2022

(54) VEHICLE PARKING LOCK MECHANISM

(71) Applicant: TOYOTA JIDOSHA KABUSHIKI KAISHA, Toyota (JP)

(72) Inventor: Masaru Morise, Nukata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/362,089

(22) Filed: Jun. 29, 2021

(65) Prior Publication Data

US 2022/0025970 A1    Jan. 27, 2022

(30) Foreign Application Priority Data

Jul. 21, 2020 (JP) .............................. JP2020-124777

(51) Int. Cl.
*F16H 63/34* (2006.01)

(52) U.S. Cl.
CPC ..... *F16H 63/3433* (2013.01); *F16H 63/3425* (2013.01)

(58) Field of Classification Search
CPC ......................................... F16H 63/3416–3491
See application file for complete search history.

(56) References Cited

U.S. PATENT DOCUMENTS

| 8,387,759 B2 * | 3/2013 | Prix ..................... F16H 63/3416 |
| | | 192/219.5 |
| 2021/0396310 A1 * | 12/2021 | Kraemer ............. F16H 63/3416 |

FOREIGN PATENT DOCUMENTS

| JP | 2002-178891 A | 6/2002 |
| JP | 2018-141520 A | 9/2018 |

* cited by examiner

*Primary Examiner* — Ernesto A Suarez
*Assistant Examiner* — James J Taylor, II
(74) *Attorney, Agent, or Firm* — Oblon, McClelland, Maier & Neustadt, L.L.P.

(57) ABSTRACT

In a vehicle parking lock mechanism, a parking pawl hinders rotation of a parking gear by engaging with the parking gear, and a lock member establishes a parking lock state by bringing the parking pawl closer to the parking gear and moving to a lock position. The cam mechanism includes a pair of a first roller and a second roller provided on the lock member. When the lock member is moved from an unlock position to the lock position, the first roller brings the parking pawl closer to the parking gear to be engaged with the parking gear and the second roller restricts the lock member from displacing in a direction away from the parking pawl. An outer peripheral surface of at least one of the first roller and the second roller includes a fixing portion that protrudes toward the lock position.

10 Claims, 10 Drawing Sheets

VEHICLE PARKING LOCK MECHANISM

CROSS-REFERENCE TO RELATED APPLICATION

This application claims priority to Japanese Patent Application No. 2020-124777 filed on Jul. 21, 2020, incorporated herein by reference in its entirety.

BACKGROUND

1. Technical Field

The present disclosure relates to a vehicle parking lock mechanism, and more particularly to a technique for suppressing a parking pawl from coming off a parking gear (hereinafter this phenomenon is referred to as P-removal) while the vehicle is in a parked state in which a P range is selected.

2. Description of Related Art

There is known a vehicle parking lock mechanism including a parking gear, a parking pawl, a lock member, and a guide member as described below. The parking pawl is provided so as to be brought closer to and separated from the parking gear and hinders rotation of the parking gear by being engaged with the parking gear. The lock member is provided so as to be reciprocally movable between a lock position and an unlock position and brings, when the lock member is moved to the lock position, the parking pawl closer to the parking gear via a cam mechanism such that the lock member is moved to the lock position to establish a parking lock state in which the parking pawl hinders rotation of the parking gear. The guide member is provided on an opposite side of the parking pawl with respect to the lock member put between the guide member and the parking pawl and includes a guide surface that guides movement of the lock member between the lock position and the unlock position while restricting the lock member from displacing in a direction away from the parking pawl. Here, the cam mechanism includes a first roller and a second roller provided on the lock member so as to be rotatable around axes perpendicular to a moving direction of the lock member and parallel to each other such that outer peripheral surfaces are brought into rolling contact with each other. When the lock member is moved from the unlock position to the lock position, the first roller is engaged with a cam surface provided on the parking pawl to bring the parking pawl closer to the parking gear and engage the parking pawl with the parking gear, while the second roller is engaged with the guide surface to restrict the lock member from displacing to the side opposite to the parking pawl. A device described in Japanese Unexamined Patent Application Publication No. 2002-178891 (JP 2002-178891 A) is an example thereof, in which a sprag 2 corresponds to the parking pawl, a rod 4 provided with a pair of rollers 7 corresponds to the lock member, and a pressing member 3 corresponds to the guide member.

In such a vehicle parking lock mechanism, when the P range for parking is selected by a shift lever or the like, the lock member is moved to the lock position and the parking pawl is engaged with the parking gear so that a wheel is locked so as not to be rotatable via the rotating shaft on which the parking gear is provided. In that case, if the road surface slope of the parked place is large, a pushing load that pushes the parking pawl out of the parking gear may be generated in accordance with rotational torque applied to the parking gear by the weight of the vehicle, and the pushing load may cause the lock member to be retracted to the unlock position side, causing the P-removal in which the parking pawl comes off the parking gear. For example, when an engaging surface of the parking pawl to be engaged with the first roller is inclined in the direction away from the guide member toward a parking release position side due to variations in the dimensions of the parts, the inclination may generate torque in the first roller causing the first roller to roll toward the unlock position side, and a force may be applied to the lock member in the retracting direction toward the unlock position side. In view of this, Japanese Unexamined Patent Application Publication No. 2018-141520 (JP 2018-141520 A) proposes a technique in which a stopper (wedge restricting means) is provided in the moving path of the lock member (wedge) so that the stopper can be advanced and retracted, and the stopper is advanced and retracted along with the shift lever, which hinders the retraction of the lock member to suppress the P-removal from occurring.

SUMMARY

However, in such a method described in JP 2018-141520 A, it is necessary to provide a stopper in the moving path of the lock member so that the stopper can be advanced and retracted, and to provide an interlocking mechanism in which the stopper is advanced and retracted along with the shift lever. With this method, there has been an issue that the complicated structure increased the size and the manufacturing cost.

The present disclosure relates to a vehicle parking lock mechanism that suppresses the P-removal from occurring in the parking lock mechanism with a simple method when parking on a slope.

A vehicle parking lock mechanism according to an aspect of the present disclosure includes a parking gear, a parking pawl, a lock member, and a guide member. The parking pawl is provided so as to be brought closer to and separated from the parking gear and is configured to hinder rotation of the parking gear by being engaged with the parking gear. The lock member is provided so as to be reciprocally movable between a lock position and an unlock position and is configured to, when the lock member is moved to the lock position, bring the parking pawl closer to the parking gear via a cam mechanism such that the lock member is moved to the lock position to establish a parking lock state in which the parking pawl hinders rotation of the parking gear. The guide member is provided on an opposite side of the parking pawl with respect to the lock member put between the guide member and the parking pawl and includes a guide surface configured to guide movement of the lock member between the lock position and the unlock position while restricting the lock member from displacing in a direction away from the parking pawl. The cam mechanism includes a pair of a first roller and a second roller provided on the lock member such that the first roller and the second roller are rotatable around axes perpendicular to a moving direction of the lock member and parallel to each other, and outer peripheral surfaces are brought into rolling contact with each other. When the lock member is moved from the unlock position to the lock position, the first roller is configured to be engaged with a cam surface provided on the parking pawl so as to bring the parking pawl closer to the parking gear to be engaged with the parking gear and the second roller is configured to be engaged with the guide surface so as to restrict the lock member from displacing in a direction away from the parking pawl. The outer peripheral surface of at least one of the first roller and the second roller includes a fixing portion that in the parking lock state protrudes toward the lock position and is brought into contact with the parking pawl or the guide surface over a predetermined engaging length.

According to the vehicle parking lock mechanism of the above aspect, the outer peripheral surface of at least one of the first roller and the second roller includes the fixing portion, and the fixing portion is brought into contact with the parking pawl or the guide surface over a predetermined engaging length in the parking lock state. Therefore, when parking on a slope, the pushing load for pushing the parking pawl out of the parking gear is generated, and when the pushing load is applied from the parking pawl to the lock member, the fixing portion is pressed against the parking pawl or the guide surface, generating sliding friction. Thus, due to the sliding friction, the rotational resistance increases until the rollers start rolling. Therefore, the force applied to the lock member in the retracting direction toward the unlock position side due to rolling of the rollers is reduced, and the P-removal where the parking pawl comes off the parking gear due to the retraction of the lock member is suppressed from occurring. In this case, it is only necessary that the fixing portion is provided on the outer peripheral surface of at least one of the first roller and the second roller, enabling the structure to be made simpler, smaller, and cheaper.

In the vehicle parking lock mechanism of the above aspect, the outer peripheral surface of the first roller may include, as the fixing portion, a first fixing portion that protrudes toward the lock position and is brought into contact with the parking pawl over a predetermined engaging length in the parking lock state.

According to the vehicle parking lock mechanism of the above configuration, with the first fixing portion provided on the outer peripheral surface of the first roller and brought into contact with the parking pawl, in the case where the parking pawl is pressed against the first fixing portion of the first roller by the pushing load when parking on a slope, the sliding friction generated by the pressing increases the rotational resistance of the first roller, and the P-removal due to the retraction of the lock member is appropriately suppressed from occurring.

In the vehicle parking lock mechanism of the above configuration, in the parking lock state a lock-side engaging surface of the parking pawl with which the first fixing portion is brought into contact may be inclined in a direction away from the guide member toward the lock position side with respect to a straight line parallel to the moving direction of the lock member.

According to the vehicle parking lock mechanism of the above configuration, since in the parking lock state the lock-side engaging surface of the parking pawl with which the first fixing portion is brought into contact is inclined in a direction away from the guide member toward the lock position side, the lock-side engaging surface being pressed against the first roller by the pushing load generates torque in the first roller causing the first roller to roll in the direction toward the lock position side. When the lock member attempts to move to the unlock position side, the parking pawl needs to be pushed back to the parking gear side due to the inclination of the lock-side engaging surface, which hinders the movement of the lock member toward the unlock position side, and the P-removal is more appropriately suppressed.

In the vehicle parking lock mechanism of the above configuration, the outer peripheral surface of the first roller may include a first adjusting portion that, in an unlock state in which the lock member is moved to the unlock position, protrudes toward the unlock position and that is brought into contact with the parking pawl over a predetermined engaging length.

According to the vehicle parking lock mechanism of the above configuration, in the case where the outer peripheral surface of the first roller includes the first adjusting portion that is brought into contact with the parking pawl over a predetermined engaging length in the unlock state, the phase (rotational position) of the first roller is adjusted so that the first adjusting portion is brought into contact with the parking pawl when the lock member is moved to the unlock position. That is, if the first roller slips and falls out of phase when the lock member is moved, the first fixing portion may be unable to appropriately be brought into contact with the parking pawl in the parking lock state, which may hinder obtaining sufficient frictional force to suppress the P-removal from occurring. In the present disclosure, since the phase adjustment is performed so that the first adjusting portion is brought into contact with the parking pawl in the unlock state, the first fixing portion is appropriately brought into contact with the parking pawl in the parking lock state, and the effect of suppressing the P-removal with the first fixing portion can be appropriately obtained.

In the vehicle parking lock mechanism of the above aspect, the outer peripheral surface of the second roller may include, as the fixing portion, a second fixing portion that in the parking lock state protrudes toward the lock position and is brought into contact with the guide surface over a predetermined engaging length.

According to the vehicle parking lock mechanism of the above configuration, with the second fixing portion provided on the outer peripheral surface of the second roller and brought into contact with the guide surface, in the case where the second fixing portion of the second roller is pressed against the guide surface by the pushing load when parking on a slope, the sliding friction generated by the pressing increases the rotational resistance of the second roller, and the P-removal due to the retraction of the lock member is appropriately suppressed from occurring.

In the vehicle parking lock mechanism of the above configuration, the guide surface with which the second fixing portion is brought into contact may be inclined in a direction away from the parking pawl toward the lock position side with respect to a straight line parallel to the moving direction of the lock member.

According to the vehicle parking lock mechanism of the above configuration, since the guide surface with which the second fixing portion is brought into contact is inclined in a direction away from the parking pawl toward the lock position side, the second roller being pressed against the guide surface by the pushing load generates torque in the second roller causing the second roller to roll in the direction toward the lock position side. When the lock member attempts to move to the unlock position side, the parking pawl needs to be pushed back to the parking gear side due to the inclination of the guide surface, which hinders the movement of the lock member toward the unlock position side, and the P-removal is more appropriately suppressed.

In the vehicle parking lock mechanism of the above configuration, the outer peripheral surface of the second roller may include a second adjusting portion that, in an unlock state in which the lock member is moved to the unlock position, protrudes toward the unlock position and that is brought into contact with the guide surface over a predetermined engaging length.

According to the vehicle parking lock mechanism of the above configuration, in the case where the outer peripheral surface of the second roller includes the second adjusting portion that is brought into contact with the guide surface over a predetermined engaging length in the unlock state, the phase (rotational position) of the second roller is adjusted so that the second adjusting portion is brought into contact with the guide surface when the lock member is moved to the unlock position. That is, if the second roller slips and falls out of phase when the lock member is moved, the second fixing portion may be unable to appropriately be brought into contact with the guide surface in the parking lock state, which may hinder obtaining sufficient frictional force to suppress the P-removal from occurring. In the present disclosure, since the phase adjustment is performed so that the second adjusting portion is brought into contact with the guide surface in the unlock state, the second fixing portion is appropriately brought into contact with the guide surface in the parking lock state, and the effect of suppressing the P-removal with the second fixing portion can be appropriately obtained.

In the vehicle parking lock mechanism of the above aspect, the outer peripheral surface of the first roller may include, as the fixing portion, a first fixing portion that in the parking lock state protrudes toward the lock position and is brought into contact with the parking pawl over a predetermined engaging length. In addition, the outer peripheral surface of the second roller may include, as the fixing portion, a second fixing portion that in the parking lock state protrudes toward the lock position and is brought into contact with the guide surface over a predetermined engaging length.

According to the vehicle parking lock mechanism of the above configuration, with the first fixing portion provided on the outer peripheral surface of the first roller to be brought into contact with the parking pawl and the second fixing portion provided on the outer peripheral surface of the second roller to be brought into contact with the guide surface, in the case where the pushing load is generated on the parking pawl when parking on a slope, the parking pawl is pressed against the first fixing portion of the first roller and the second fixing portion of the second roller is pressed against the guide surface due to the pushing load. Since the sliding friction generated by this pressing increases the rotational resistance of both the first roller and the second roller, as compared with the case where the fixing portion is provided only on one of the rollers, it is possible to more appropriately suppress the P-removal due to the retraction of the lock member from occurring.

In the vehicle parking lock mechanism of the above configuration, the outer peripheral surface of the first roller may include a first adjusting portion that, in an unlock state in which the lock member is moved to the unlock position, protrudes toward the unlock position and that is brought into contact with the parking pawl over a predetermined engaging length. In addition, the outer peripheral surface of the second roller may include a second adjusting portion that, in the unlock state, protrudes toward the unlock position and that is brought into contact with the guide surface over a predetermined engaging length.

According to the vehicle parking lock mechanism of the above configuration, with the first adjusting portion provided on the outer peripheral surface of the first roller to be brought into contact with the parking pawl and the second adjusting portion provided on the outer peripheral surface of the second roller to be brought into contact with the guide surface, when the lock member is moved to the unlock position, the phase (rotational position) of the first roller is adjusted so that the first adjusting portion is brought into contact with the parking pawl, and the phase (rotational position) of the second roller is adjusted so that the second adjusting portion is brought into contact with the guide surface. That is, if the first roller and the second roller slip and fall out of phase when the lock member is moved, in the parking lock state the first fixing portion may be hindered from appropriately being brought into contact with the parking pawl and the second fixing portion may be hindered from appropriately being brought into contact with the guide surface, which may hinder obtaining sufficient frictional force to suppress the P-removal from occurring. In the present disclosure, since the phase adjustment of the first roller and the second roller is performed in the unlock state, in the parking lock state the first fixing portion is appropriately brought into contact with the parking pawl and the second fixing portion is appropriately brought into contact with the guide surface. Thus, the effect of suppressing the P-removal with the first fixing portion and the second fixing portion can be appropriately obtained.

In the vehicle parking lock mechanism of the above configuration, the first roller and the second roller may be provided with a first gear and a second gear so as not to be rotatable with respect to the first gear and the second gear, respectively. The first gear and the second gear mesh with each other such that the first roller and the second roller are synchronously rotated in a predetermined phase.

According to the vehicle parking lock mechanism of the above configuration, when the first roller and the second roller are provided with the first gear and the second gear so as not to be rotatable with respect to the first gear and the second gear, respectively, and the first gear and the second gear mesh with each other such that the first roller and the second roller are synchronously rotated in a predetermined phase, it is possible to suppress the first roller and the second roller from slipping and falling out of phase when the lock member is moved. That is, if the first roller and the second roller slip and fall out of phase when the lock member is moved, in the parking lock state the first fixing portion may be hindered from appropriately being brought into contact with the parking pawl and the second fixing portion may be hindered from appropriately being brought into contact with the guide surface, which may hinder obtaining sufficient frictional force to suppress the P-removal from occurring. In the present disclosure, since the synchronous rotation of the first gear and the second gear suppresses the first roller and the second roller from falling out of phase, the first fixing portion is appropriately brought into contact with the parking pawl and the second fixing portion is appropriately brought into contact with the guide surface in the parking lock state. Thus, the effect of suppressing the P-removal with the first fixing portion and the second fixing portion can be appropriately obtained.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. Note that, in the following embodiment, the drawings are appropriately simplified or modified for convenience of description, and the dimensional ratios and shapes of the respective parts are not necessarily drawn accurately.

Figure 1:
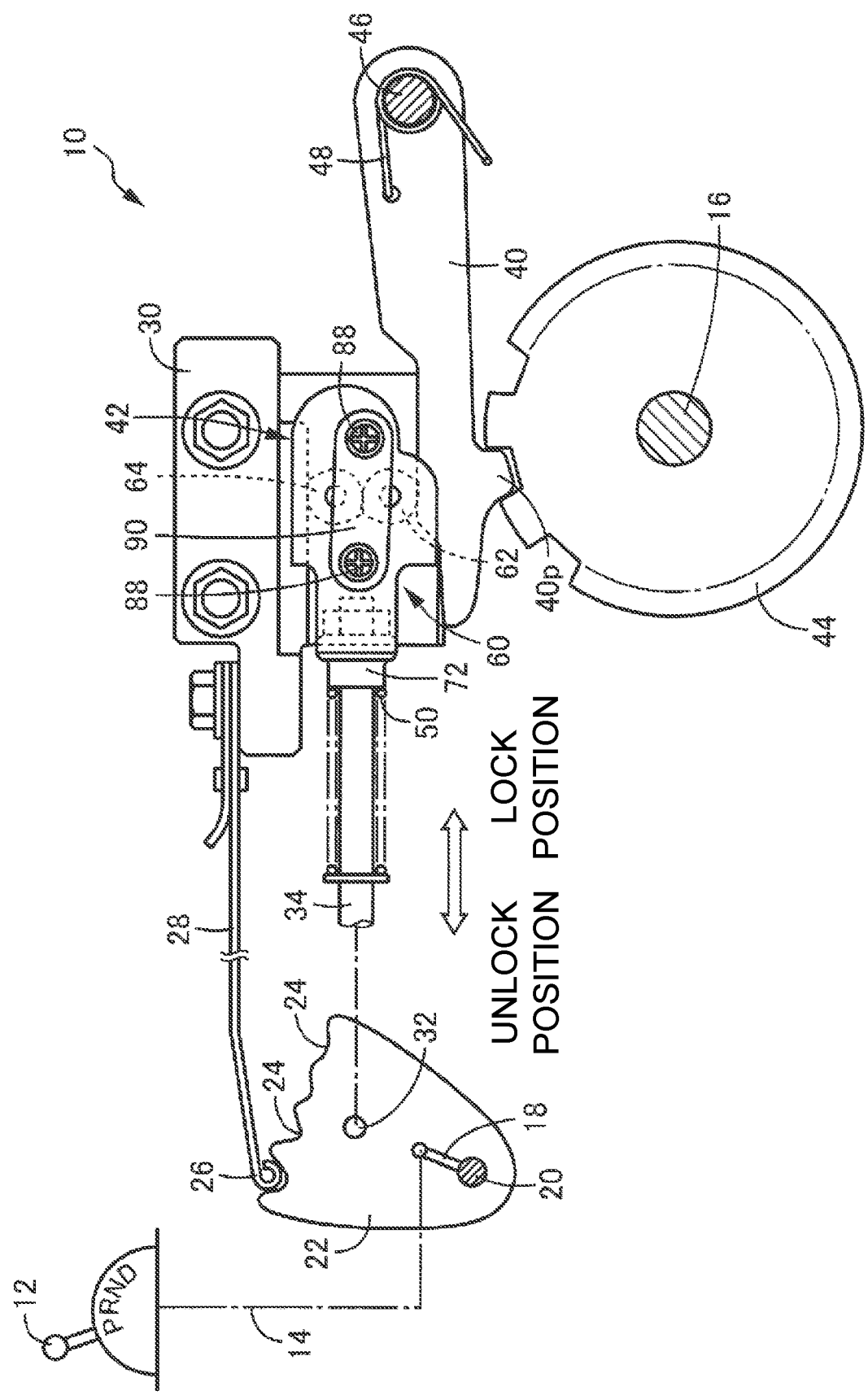
FIG. 1 is a diagram illustrating a vehicle parking lock mechanism according to an embodiment as an example of the present disclosure, and is a schematic configuration diagram showing a parking lock state.

FIG. 1 is a schematic configuration diagram illustrating a vehicle parking lock mechanism 10, which is an embodiment of the present disclosure. The vehicle parking lock mechanism 10 is a manually operated parking lock mechanism in which the shift range is mechanically switched by a shift lever 12 via an interlocking device 14 such as a link or a push-pull cable. The shift lever 12 is provided near the driver's seat so that it can be rotated to four positions of parking (P), reverse (R), neutral (N), and drive (D) in accordance with the shift operation of the driver. The P position is a shift operation position for selecting a P range for parking that shuts off power transmission and mechanically hinders rotation of an output shaft 16 of the automatic transmission. The R position is a shift operation position for selecting an R range that enables reverse travel. Further, the N position is a shift operation position for selecting an N range that shuts off power transmission, and the D position is a shift operation position for selecting a D range that enables forward traveling.

The shift lever 12 is connected to an outer lever 18 via the interlocking device 14. The outer lever 18 is fixed to a manual shaft 20, and a detent plate 22 is fixed to the manual shaft 20. Thus, the detent plate 22 is rotated around the axis of the manual shaft 20 in accordance with the shift operation position of the shift lever 12, and is positioned at four rotation positions, namely, the P position, the R position, the N position, and the D position. The tip portion of the detent plate 22 is provided with irregularities having four positioning recesses 24 so that a locking portion 26 is engaged with the positioning recesses 24. The locking portion 26 is a rounded tip portion of a spring plate 28, and is displaced along the irregularities by elastic deformation of the spring plate 28. The detent plate 22 is given a predetermined moderation (positioning force) at each rotation position of P, R, N, and D. The spring plate 28 is mounted to a support member 30 fixed to a transmission case or the like. FIG. 1 shows a state in which the shift lever 12 is shifted to the P position, and the detent plate 22 is mechanically rotated clockwise of the manual shaft 20 and held at the P position.

The detent plate 22 is provided with a connecting hole 32, and a parking rod 34 is connected to the detent plate 22 so as to be relatively rotatable. The parking rod 34 is reciprocated substantially linearly in the longitudinal direction, that is, in the right-left direction in FIG. 1, as the detent plate 22 rotates, and is moved to the lock position in the right direction and the unlock position in the left direction in FIG. 1. The lock position is a position when the shift lever 12 is shifted to the P position and the detent plate 22 is rotated clockwise of the manual shaft 20 to the P position as shown in FIG. 1. The unlock position is the position when the shift lever 12 is shifted to a non-P position such as the R position and the detent plate 22 is rotated counterclockwise of the manual shaft 20 to the non-P position such as the R position. In the present embodiment, a play mechanism is provided between the shift lever 12 and the parking rod 34 so that the parking rod 34 is held at a constant unlock position in the non-P positions from the R position to the D position. In other words, when the shift lever 12 is operated to the P position, the parking rod 34 is brought into the lock position in the right direction in FIG. 1, and when the shift lever 12 is operated to the R position, the parking rod 34 is brought into the unlock position in the left direction in FIG. 1. Further, when the shift lever 12 is operated between the non-P positions from the R position to the D position, the parking rod 34 is held at a constant unlock position regardless of the shift operation.

A lock member 42 that is engaged with a parking pawl 40 is provided at the tip portion of the parking rod 34, and the lock member 42 is moved to the lock position together with the parking rod 34, whereby the parking pawl 40 is rotated downward in FIG. 1 and a meshing tooth 40p is meshed with a parking gear 44. The parking gear 44 is mounted to the output shaft 16 of the automatic transmission so as not to rotate relative to the output shaft 16. The parking pawl 40 is provided in a transmission case or the like so as to be rotatable around the axis of a pawl shaft 46 parallel to the output shaft 16, and is urged in the unmeshing direction (clockwise direction in FIG. 1) by a return spring 48 that is an urging device, and the lock member 42 rotates the parking pawl 40 in the meshing direction (counterclockwise direction in FIG. 1) against the urging force of the return spring 48. That is, the parking pawl 40 is provided so that the meshing tooth 40p can be brought closer to and separated from the parking gear 44, and when the parking pawl 40 is rotated by the lock member 42 in the meshing direction that is downward in FIG. 1, the meshing tooth 40p is brought closer to the parking gear 44 and meshed with the parking gear 44, resulting in a parking lock state in which the rotation of the parking gear 44 and accordingly the rotation of the output shaft 16 and the wheel are mechanically hindered. FIG. 1 is a diagram showing this parking lock state.

The lock member 42 is urged toward the tip end side of the parking rod 34 by a spring member (compression coil spring in the embodiment) 50 that is an urging device, and is held at the tip end position on the lock position side to rotate the parking pawl 40 in the meshing direction. However, when the parking pawl 40 and the parking gear 44 interfere with each other, the lock member 42 is allowed to retract toward the unlock position relative to the parking rod 34 against the urging force of the spring member 50. The lock member 42 is supported by the support member 30 so as to be linearly reciprocable between the lock position and the unlock position while having a predetermined play, that is, in a state where the lock member 42 is displaceable, in a direction perpendicular to the moving direction (vertical direction in FIG. 1). Further, the manual shaft 20 is provided in a posture parallel to the output shaft 16 on the opposite side of the output shaft 16 from the pawl shaft 46, and the lock member 42 is allowed to approach the parking pawl 40 from the tip end side of the parking pawl 40 (left side in FIG. 1).

Figure 2:
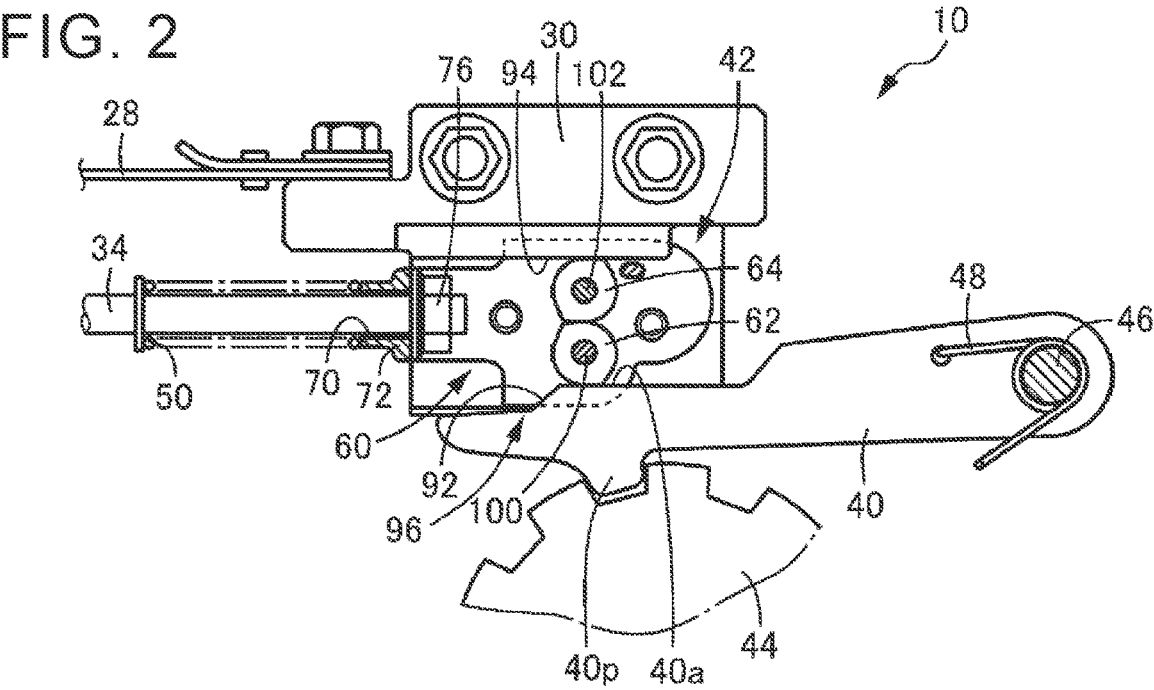
FIG. 2 is a diagram illustrating a portion near a lock member in the vehicle parking lock mechanism in FIG. 1, and is a front view in which a part is cut out.
Figure 3:
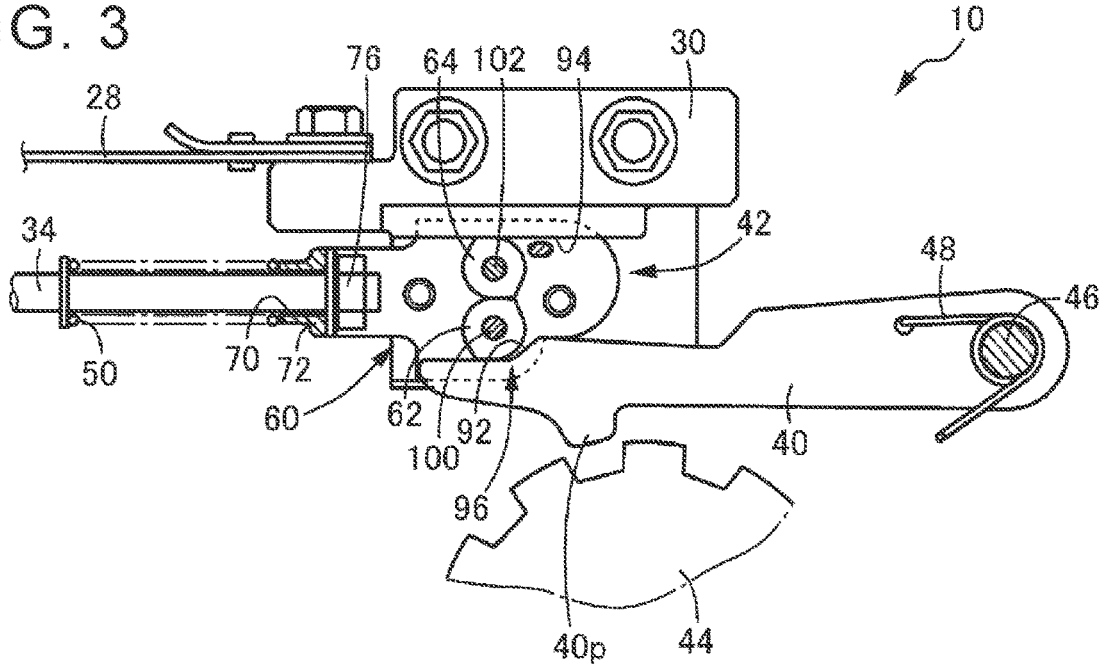
FIG. 3 is a diagram illustrating an unlock state of the vehicle parking lock mechanism in FIG. 1, and is a front view corresponding to FIG. 2.

FIGS. 2 and 3 are diagrams illustrating the lock member 42 and a portion near the lock member 42 in detail, and are front views in which a part is cut out. FIG. 2 shows the same parking lock state as in FIG. 1. FIG. 3 shows an unlock state in which the lock member 42 is moved to the unlock position and the parking pawl 40 and the parking gear 44 are disengaged. In these figures, the lock member 42 includes a connecting head 60 and a pair of a first roller 62 and a second roller 64.

Figure 4:
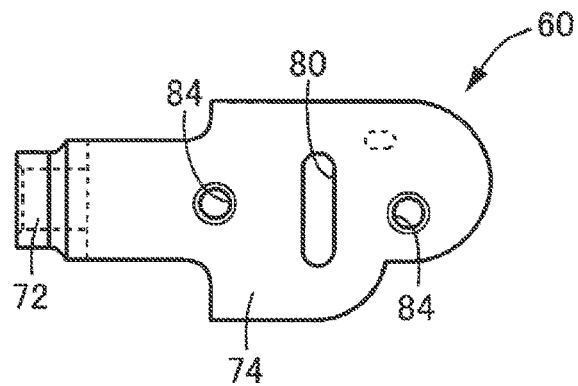
FIG. 4 is a front view showing solely a connecting head of the lock member provided in the vehicle parking lock mechanism in FIG. 1.
Figure 5:
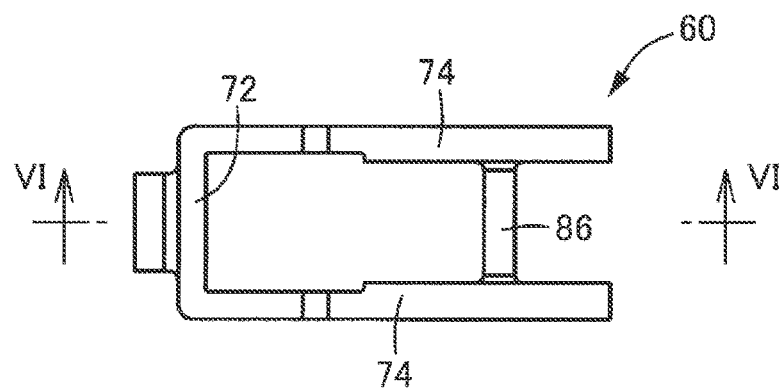
FIG. 5 is a plan view of the connecting head in FIG. 4.
Figure 6:
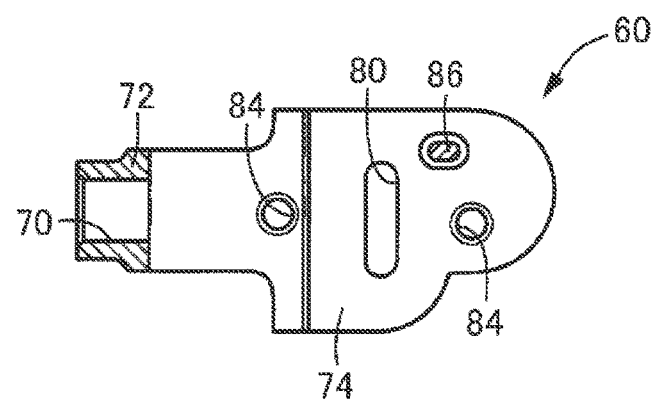
FIG. 6 is a sectional view seen from the VI-VI arrow in FIG. 5.

FIG. 4 is a front view showing the connecting head 60 alone, FIG. 5 is a plan view of the connecting head 60, and FIG. 6 is a sectional view seen from an VI-VI arrow in FIG. 5. The connecting head 60 has a substantially U-shaped bifurcated shape, and has a connecting portion 72 provided with an insertion hole 70 through which the parking rod 34 is inserted, and a pair of side wall portions 74 that are parallel to each other and that extend in the axial direction of the insertion hole 70 from both ends of the connecting portion 72. As shown in FIGS. 2 and 3, the parking rod 34 is inserted into the insertion hole 70 so as to be relatively movable in the axial direction, and a nut 76 is fixed to the tip portion of the parking rod 34 that protrudes to the inside of the connecting head 60 from the insertion hole 70. The spring member 50 is locked to the peripheral edge of the insertion hole 70. Thus, the connecting head 60 is held at the tip position of the parking rod 34 where the connecting portion 72 is normally brought into contact with the nut 76 in accordance with the urging force of the spring member 50, is allowed to be separated from the nut 76 against the urging force of the spring member 50, and is allowed to retract in the direction of the unlock position relative to the parking rod 34.

The connecting head 60 is held by the support member 30 so as to have a posture in which the side wall portions 74 are perpendicular to the axis of the output shaft 16, that is, a posture in which the side wall portions 74 are parallel to the paper surface and separated from each other in the front and back directions of the paper surface in FIGS. 1 to 3. The side wall portions 74 are each provided with an oval roller mounting hole 80 and a pair of screw holes 84. The positions of the roller mounting hole 80 and the screw holes 84 are the same in the side wall portions 74. A reinforcing connecting portion 86 is provided so as to connect the side wall portions 74. The screw holes 84 are provided on opposite sides of the roller mounting holes 80 in the extending direction of the side wall portion 74.

The roller mounting hole 80 is an elongated hole that is long in a direction perpendicular to the longitudinal direction of the side wall portions 74, that is, in a direction perpendicular to the moving direction of the lock member 42, and as shown in FIGS. 2 and 3, holds the first roller 62 and the second roller 64 in a posture substantially parallel to the output shaft 16 via mounting pins 100 and 102. The first roller 62 and the second roller 64 are supported by the roller mounting holes 80 via the mounting pins 100 and 102 so as to be rotatable around axes perpendicular to the moving direction of the lock member 42 and parallel to each other so that the outer peripheral surfaces are in contact with each other. The mounting pins 100 and 102 protrude toward both sides of the first roller 62 and the second roller 64, respectively, and both end portions thereof are inserted into and supported by the roller mounting holes 80 of the side wall portions 74 with a predetermined play. The first roller 62 and the second roller 64 are held so as to be rotatable around the axes while being displaceable in the vertical direction by a predetermined amount between the side wall portions 74. The mounting pins 100 and 102 are hindered from falling off the connecting head 60 by a pair of holding plates 90 (see FIG. 1). The holding plates 90 are mounted to the side wall portions 74 via screws 88 screwed into the screw holes 84 so as to be in close contact with the outer surfaces of the side wall portions 74. In the present embodiment, the mounting pins 100 and 102 are provided so as to be rotatable with respect to the side wall portions 74, and the first roller 62 and the second roller 64 are fixed so as not to rotate relative to the mounting pins 100 and 102. However, the mounting pins 100 and 102 may be provided in a fixed position with respect to the side wall portions 74, and the first roller 62 and the second roller 64 may be provided so as to be rotatable with respect to the mounting pins 100 and 102.

The first roller 62 and the second roller 64 are provided vertically side by side between the parking pawl 40 and the support member 30 provided on both sides of the lock member 42 in the vertical direction. The first roller 62 on the parking pawl 40 side is engaged with the parking pawl 40 when the lock member 42 is moved from the unlock position to the lock position, and brings the parking pawl 40 closer to the parking gear 44 so that the parking pawl 40 is engaged with the parking gear 44. The parking pawl 40 is provided with a cam surface (an inclined surface in the present embodiment) 92 that is engaged with the first roller 62 to rotate the parking pawl 40 in the meshing direction. Further, the second roller 64 on the support member 30 side is for restricting the lock member 42 from displacing away from the parking pawl 40, by engaging with a guide surface 94 provided on the support member 30 when the lock member 42 is moved between the lock position and the unlock position. The guide surface 94 is provided on the opposite side of the lock member 42 from the parking pawl 40 so as to be parallel to the moving direction of the lock member 42 (right-left direction in FIGS. 1 to 3), and guides the lock member 42 via the second roller 64 so that the lock member 42 reciprocates substantially linearly between the lock position and the unlock position while restricting the lock member 42 from displacing in the direction away from the parking pawl 40. The support member 30 provided with the guide surface 94 corresponds to the guide member.

That is, when the lock member 42 is moved from the unlock position to the lock position, the first roller 62 and the second roller 64 are compressed between the parking pawl 40 and the guide surface 94 and rotate relative to each other while the outer peripheral surfaces are in contact with each other. Thus, the parking pawl 40 is rotated in the meshing direction by the engagement between the first roller 62 and the cam surface 92 while restricting the lock member 42 from displacing in the direction away from the parking pawl 40, whereby the parking pawl 40 can be engaged with the parking gear 44. In the parking lock state in which the lock member 42 is moved to the lock position, a lock-side engaging surface 40a (see FIG. 2) provided on the parking pawl 40 so as to be parallel to the moving direction of the lock member 42 is engaged with the first roller 62, and the first roller 62 and the second roller 64 are sandwiched between the lock-side engaging surface 40a and the guide surface 94, both of which are provided parallel to the moving direction of the lock member 42. As a result, the parking lock state is stably maintained in combination with the rolling resistance of the first roller 62 and the second roller 64. In the present embodiment, a cam mechanism 96 including the first roller 62, the second roller 64, and the cam surface 92 is configured to bring the parking pawl 40 closer to the parking gear 44 and engage the parking pawl 40 with the parking gear 44.

Here, when rotational torque is applied to the parking gear 44 by the weight of the vehicle when parking on a slope, a pushing load for pushing the parking pawl 40 out of the parking gear 44 is generated in accordance with the rotational torque. When such a pushing load is applied from the parking pawl 40 to the lock member 42, even in the parking lock state where the parking pawl 40 is maintained relatively stably, the pushing load may cause the lock member 42 to be retracted to the unlock position side, causing the P-removal in which the meshing tooth 40p of the parking pawl 40 comes off the parking gear 44. For example, when the lock-side engaging surface 40a of the parking pawl 40 to be engaged with the first roller 62 is inclined in the direction away from the guide surface 94 toward a parking release position side due to variations in the dimensions of the parts, the inclination may generate torque in the first roller 62 causing the first roller 62 to roll toward the unlock position side, and a force may be applied to the lock member 42 in the retracting direction toward the unlock position side.

Figure 7:
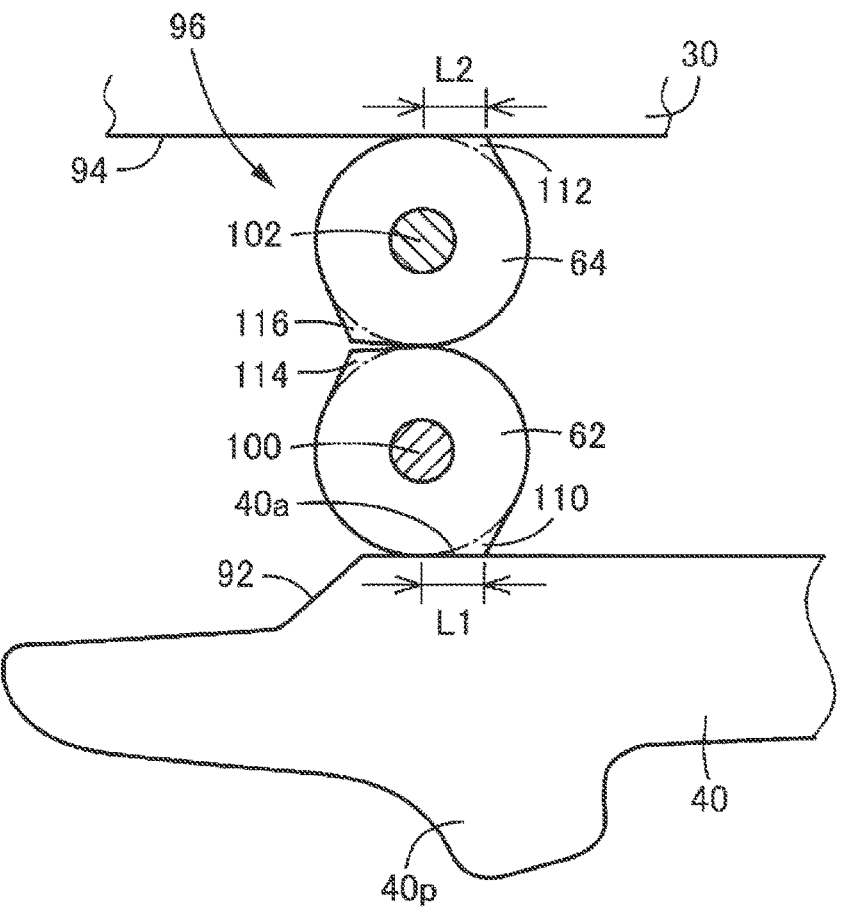
FIG. 7 is an enlarged front view of a cam mechanism portion of the vehicle parking lock mechanism in FIG. 1 in the parking lock state.
Figure 8:
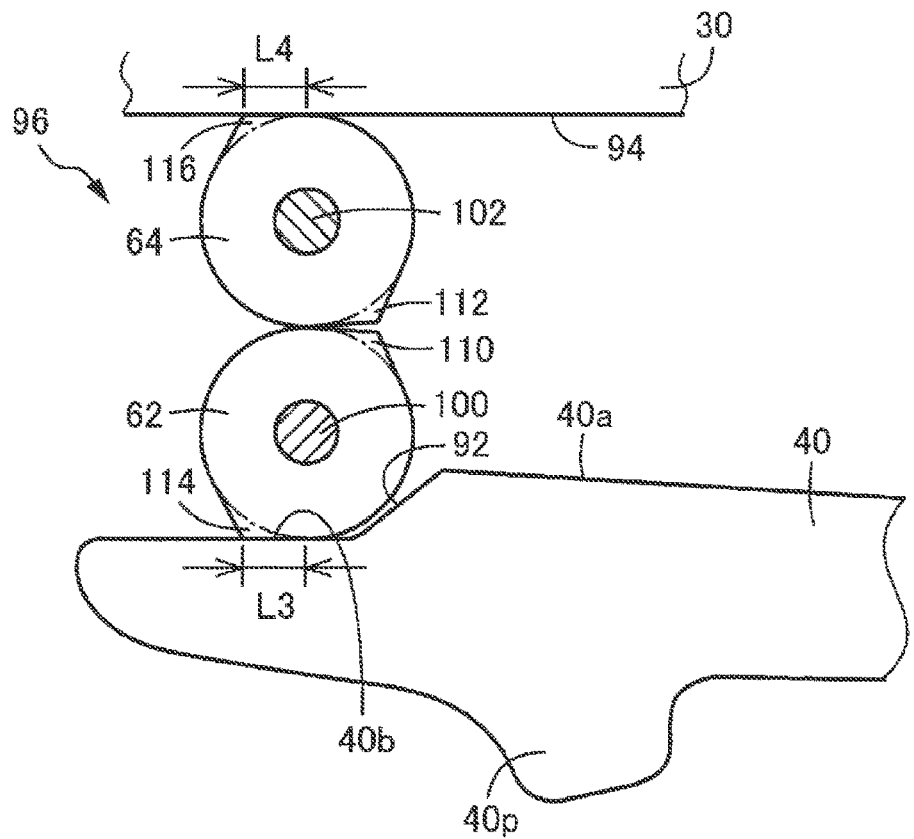
FIG. 8 is an enlarged front view of a cam mechanism portion of the vehicle parking lock mechanism in FIG. 1 in an unlock state.

In view of this, in the present embodiment, as shown in FIGS. 7 and 8, the first roller 62 is provided with a first fixing portion 110 and the second roller 64 is provided with a second fixing portion 112 to suppress the P-removal from occurring. FIG. 7 is an enlarged front view of a portion near the cam mechanism 96 of the vehicle parking lock mechanism 10 in the parking lock state, and FIG. 8 is an enlarged front view of a portion near the cam mechanism 96 in the unlock state. In these drawings, the first fixing portion 110 protruding toward the lock position, that is, in the right direction in FIG. 7, in the parking lock state is provided on the outer peripheral surface of the first roller 62, and is brought into contact with the lock-side engaging surface 40a of the parking pawl 40 over a predetermined engaging length L1. Further, the second fixing portion 112 protruding toward the lock position in the parking lock state is provided on the outer peripheral surface of the second roller 64, and is brought into contact with the guide surface 94 over a predetermined engaging length L2. Each of the first fixing portion 110 and the second fixing portion 112 has an isosceles triangle shape in a section perpendicular to the axis, and both of the two sides thereof protrude in the tangential direction of the outer peripheral surface of the first roller 62 and the second roller 64. Of the two sides of the first fixing portion 110, the side that is not brought into contact with the lock-side engaging surface 40a can be appropriately changed, and may be, for example, perpendicular to (may extend in the normal direction of) the outer peripheral surface. The same applies to the second fixing portion 112. The long dashed short dashed lines shown in the first roller 62 and the second roller 64 show a perfect circle, and are auxiliary lines illustrated so that the protruding shapes of the first fixing portion 110, the second fixing portion 112, and the like are clarified.

Thus, when an upward pushing load is applied to the parking pawl 40 in FIG. 7, the lock-side engaging surface 40a of the parking pawl 40 is pressed against the first fixing portion 110 of the first roller 62 by the pushing load and the second fixing portion 112 of the second roller 64 is pressed against the guide surface 94, generating sliding friction at the contact portions thereof. Since the rotational resistance until the first roller 62 and the second roller 64 start rolling increases due to the sliding friction and the rolling resistance, the force applied to the lock member 42 in the retracting direction toward the unlock position side due to rolling of the first roller 62 and the second roller 64 is reduced, and the P-removal where the parking pawl 40 comes off the parking gear 44 due to the retraction of the lock member 42 is suppressed from occurring. That is, the contact portion between the first roller 62 and the lock-side engaging surface 40a and the contact portion between the second roller 64 and the guide surface 94 are elastically deformed based on the pushing load, and until the rollers 62 and 64 roll so that the first fixing portion 110 separates from the lock-side engaging surface 40a and the second fixing portion 112 separates from the guide surface 94, the sliding friction is generated at the contact portions and the rotational resistance increases. The predetermined engaging lengths L1 and L2 are appropriately determined in advance by experiments or the like so as to obtain the desired effect of suppressing the P-removal from occurring, and vary depending on the sizes of the first roller 62 and the second roller 64. For example, the predetermined engaging lengths L1 and L2 are in a range of about 2 mm to 4 mm, and is about 3 mm in the present embodiment. That is, the diameters of the first roller 62 and the second roller 64 are about 10 mm, and the engaging lengths L1 and L2 are set within the range of, for example, about 20% to 40% of the diameters of the rollers 62 and 64. The equation L1 L2 may be satisfied. The first fixing portion 110 is a fixing portion provided on the first roller 62, and the second fixing portion 112 is a fixing portion provided on the second roller 64. During the P-removal operation in which the shift lever 12 is shifted from the P position to the non-P position to move the lock member 42 from the lock position to the unlock position, the first roller 62 and the second roller 64 only need to be rolled against the rolling friction, and the effect of the sliding friction by the first fixing portion 110 and the second fixing portion 112 is small.

If the first roller 62 and the second roller 64 slip and fall out of phase when the lock member 42 is moved, the first fixing portion 110 of the first roller 62 may be hindered from appropriately being brought into contact with the lock-side engaging surface 40a of the parking pawl 40 and the second fixing portion 112 of the second roller 64 may be hindered from appropriately being brought into contact with the guide surface 94 in the parking lock state, which may hinder obtaining sufficient frictional force to suppress the P-removal from occurring. In order to suppress this, a first adjusting portion 114 protruding toward the unlock position in the unlock state shown in FIG. 8, that is, in the left direction in FIG. 8, is provided on the outer peripheral surface of the first roller 62, and is brought into contact with an unlock-side engaging surface 40b of the parking pawl 40 over a predetermined engaging length L3. In addition, a second adjusting portion 116 protruding toward the unlock position in the unlock state is provided on the outer peripheral surface of the second roller 64, and is brought into contact with the guide surface 94 over a predetermined engaging length L4. In this way, when the phase of the first roller 62 is mechanically adjusted so that the first adjusting portion 114 is brought into contact with the unlock-side engaging surface 40b and the phase of the second roller 64 is mechanically adjusted so that the second adjusting portion 116 is brought into contact with the guide surface 94 in the unlock state, the first fixing portion 110 of the first roller 62 is appropriately brought into contact with the lock-side engaging surface 40a and the second fixing portion 112 of the second roller 64 is appropriately brought into contact with the guide surface 94 in the parking lock state, and the P-removal is appropriately suppressed from occurring due to the sliding friction thereof. The engaging lengths L3 and L4 are appropriately determined so that the phases of the first roller 62 and the second roller 64 are mechanically adjusted when the lock member 42 is moved to the unlock position, and for example, are set to be about the same as the engaging lengths L1 and L2. Similar to the first fixing portion 110 and the second fixing portion 112, the first adjusting portion 114 and the second adjusting portion 116 also have isosceles triangle shapes in sections, and both of the two sides protrude in the tangential direction of the outer peripheral surfaces of the first roller 62 and the second roller 64, but one of the two sides that is not brought into contact with the unlock-side engaging surface 40b or the guide surface 94 can be appropriately changed.

As described above, in the vehicle parking lock mechanism 10 of the present embodiment, the first fixing portion 110 is provided on the outer peripheral surface of the first roller 62, and is brought into contact with the lock-side engaging surface 40a of the parking pawl 40 over a predetermined engaging length L1 in the parking lock state, and the second fixing portion 112 is provided on the outer peripheral surface of the second roller 64, and is brought into contact with the guide surface 94 over a predetermined engaging length L2 in the parking lock state. Therefore, when parking on a slope, the pushing load for pushing the parking pawl 40 out of the parking gear 44 is generated, and the pushing load is applied from the parking pawl 40 to the lock member 42, the lock-side engaging surface 40a of the parking pawl 40 is pressed against the first fixing portion 110 of the first roller 62 and the second fixing portion 112 of the second roller 64 is pressed against the guide surface 94, generating sliding friction at the contact portions thereof. Thus, due to the sliding friction, the rotational resistance until the first roller 62 and the second roller 64 start rolling increases. With this rotational resistance, the force applied to the lock member 42 in the retracting direction toward the unlock position side due to rolling of the first roller 62 and the second roller 64 is reduced, and the P-removal where the parking pawl 40 comes off the parking gear 44 due to the retraction of the lock member 42 is suppressed from occurring.

In particular, in the present embodiment, since the first roller 62 is provided with the first fixing portion 110 and the second roller 64 is provided with the second fixing portion 112, as compared with the case where the fixing portion is provided only on one of the rollers, it is possible to more appropriately suppress the P-removal due to the retraction of the lock member 42 from occurring.

Further, in the present embodiment, it is only necessary that the first fixing portion 110 is provided on the outer peripheral surface of the first roller 62 and the second fixing portion 112 is provided on the outer peripheral surface of the second roller 64. Therefore, as compared with the case where a stopper is provided as described in JP 2018-141520 A, the structure can be made simpler, smaller, and cheaper.

Further, the first adjusting portion 114 is provided on the outer peripheral surface of the first roller 62 and the second adjusting portion 116 is provided on the outer peripheral surface of the second roller 64, and when the lock member 42 is moved to the unlock position, the phase of the first roller 62 is adjusted so that the first adjusting portion 114 is brought into contact with the unlock-side engaging surface 40b of the parking pawl 40, and the phase of the second roller 64 is adjusted so that the second adjusting portion 116 is brought into contact with the guide surface 94. As a result, in the parking lock state, the first fixing portion 110 is appropriately brought into contact with the lock-side engaging surface 40a of the parking pawl 40, and the second fixing portion 112 is appropriately brought into contact with the guide surface 94. Thus, the effect of suppressing the P-removal with the first fixing portion 110 and the second fixing portion 112 can be appropriately obtained.

Next, modifications of the embodiment will be described. In the following modifications, the parts substantially common to the above embodiment are designated by the same reference signs, and detailed description thereof will be omitted.

Figure 9:
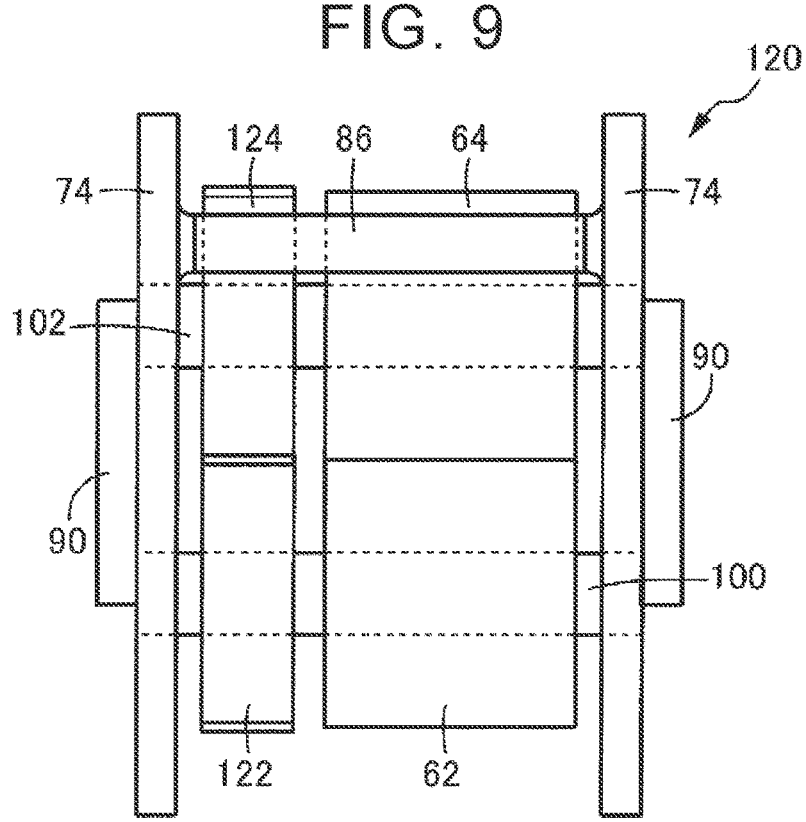
FIG. 9 is a diagram illustrating an example in which a first gear and a second gear are provided for synchronously rotating a pair of a first roller and a second roller of a cam mechanism as a first modification of the present embodiment, and is a side view of the lock member seen from the right in FIG. 2.

The first modification of the embodiment will be described. In the lock member 120 in FIG. 9, a first gear 122 and a second gear 124, which are meshed with each other, are provided so as not to rotate relative to the first roller 62 and the second roller 64, respectively, so that the first roller 62 and the second roller 64 are rotated synchronously in a predetermined phase, in other words, so that the first fixing portion 110 is brought into contact with the lock-side engaging surface 40a of the parking pawl 40 over the engaging length L1 and the second fixing portion 112 is brought into contact with the guide surface 94 over the engaging length L2 in the parking lock state. Specifically, the first gear 122 and the second gear 124, which are meshed with each other, are respectively fixed to the mounting pin 100 and the mounting pin 102 to which the first roller 62 and the second roller 64 are fixed, so as not to rotate relative to the mounting pin 100 and the mounting pin 102. FIG. 9 is a side view seen from the right direction in FIG. 2, that is, a side view seen from the tip end side of the lock member 120. Either one of the first gear 122 and the second gear 124 may be engaged with a rack provided in the transmission case or the like in a fixed position parallel to the moving direction of the lock member 120, to rotate the first roller 62 and the second roller 64 in accordance with the position of the lock member 120.

In the first modification, since the synchronous rotation of the first gear 122 and the second gear 124 suppresses the first roller 62 and the second roller 64 from falling out of phase, in the parking lock state, the first fixing portion 110 of the first roller 62 is appropriately brought into contact with the lock-side engaging surface 40a of the parking pawl 40 and the second fixing portion 112 of the second roller 64 is appropriately brought into contact with the guide surface 94. Thus, the effect of suppressing the P-removal with the first fixing portion 110 and the second fixing portion 112 can be appropriately obtained.

Particularly, in the first modification, since the phases of the first roller 62 and the second roller 64 are also adjusted by the first adjusting portion 114 and the second adjusting portion 116, for example, the phases of the first roller 62 and the second roller 64 are appropriately adjusted regardless of the rotation error due to a backlash between the first gear 122 and the second gear 124. That is, if the phase shift of the first roller 62 and the second roller 64 is large due to slipping or the like, the phase adjustment by the first adjusting portion 114 and the second adjusting portion 116 may not be performed appropriately. However, synchronous rotation of the first gear 122 and the second gear 124 suppresses a large phase shift between the first roller 62 and the second roller 64, enabling fine phase adjustment to be appropriately performed by the first adjusting portion 114 and the second adjusting portion 116, and the effect of suppressing the P-removal with the first fixing portion 110 and the second fixing portion 112 can be obtained more appropriately.

Figure 10:
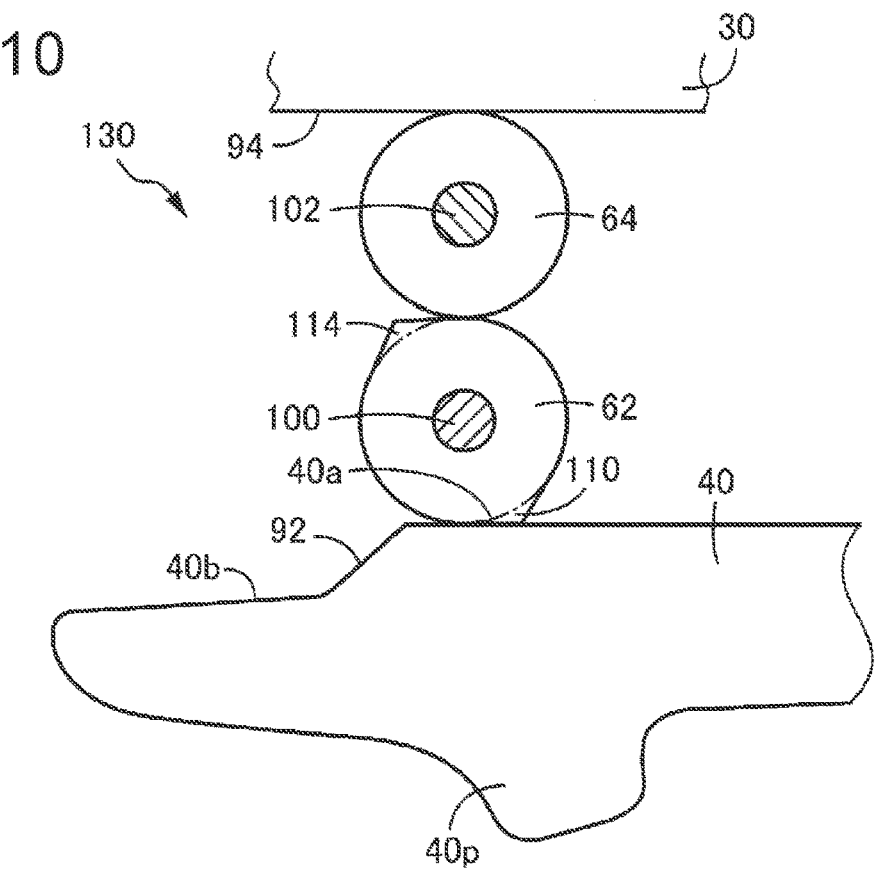
FIG. 10 is a diagram illustrating an example in which an outer peripheral surface of the second roller of the cam mechanism is a cylindrical surface as a second modification of the present embodiment, and is a front view corresponding to FIG. 7.

Next, the second modification of the embodiment will be described. FIG. 10 is a front view corresponding to FIG. 7, and the second fixing portion 112 and the second adjusting portion 116 of the second roller 64 are omitted in the cam mechanism 130. In the second modification, the P-removal due to the retraction of the lock member 42 is suppressed from occurring based on the sliding friction of the first fixing portion 110 provided on the first roller 62. Further, since the first adjusting portion 114 provided on the first roller 62 adjusts the phase of the first roller 62, the effect of suppressing the P-removal with the first fixing portion 110 can be appropriately obtained.

Figure 11:
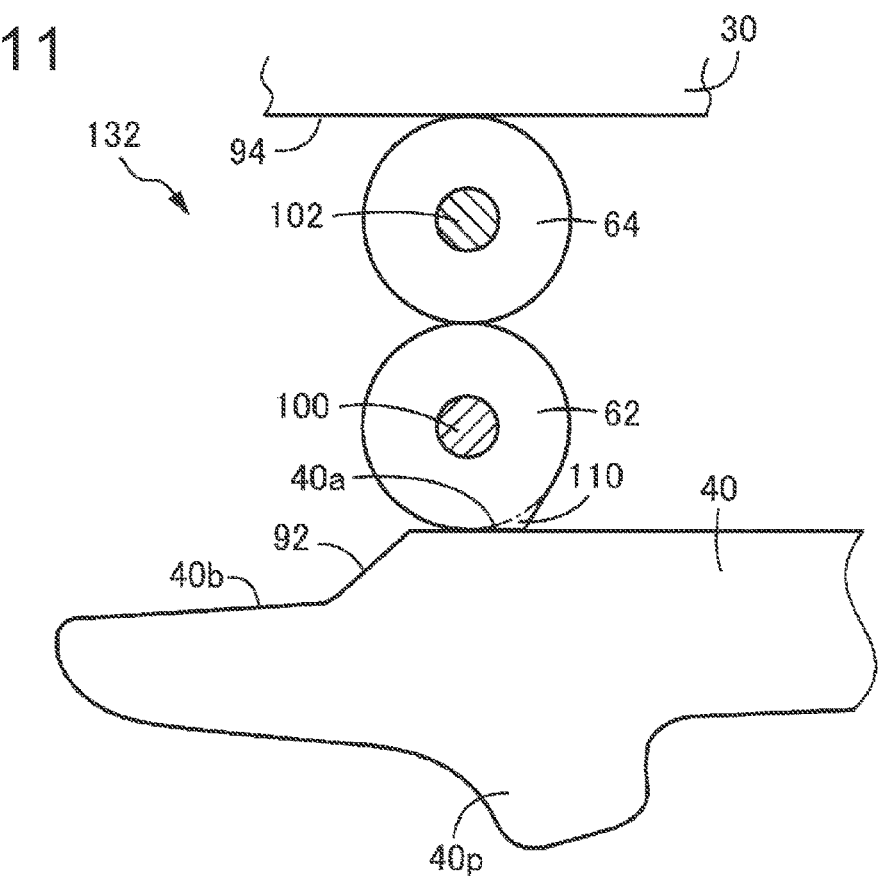
FIG. 11 is a front view illustrating an example in which a first adjusting portion of the first roller is omitted in the second modification in FIG. 10 as a third modification of the present embodiment.

Next, the third modification of the embodiment will be described. In the cam mechanism 132 in FIG. 11, the first adjusting portion 114 of the first roller 62 is omitted as compared with the second modification in FIG. 10. In the third modification, although the phase adjusting effect of the first roller 62 by the first adjusting portion 114 cannot be obtained, the sliding friction of the first fixing portion 110 suppresses the P-removal due to the retraction of the lock member 42 from occurring.

Figure 12:
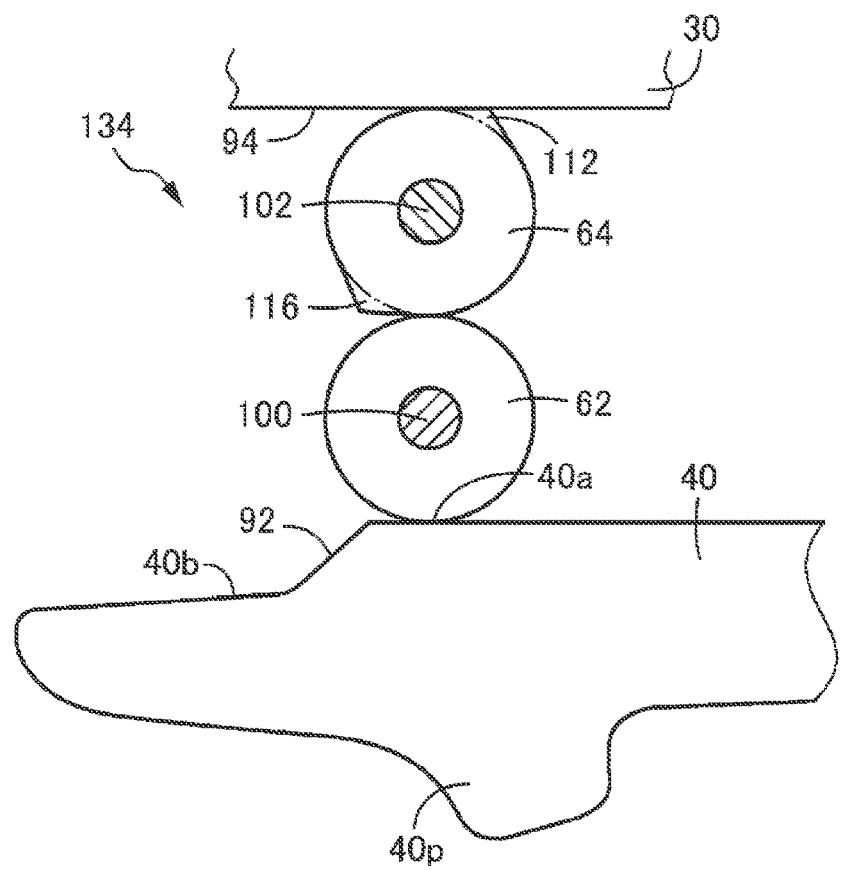
FIG. 12 is a diagram illustrating an example in which an outer peripheral surface of the first roller of the cam mechanism is a cylindrical surface as a fourth modification of the present embodiment, and is a front view corresponding to FIG. 7.

Next, the fourth modification of the embodiment will be described. FIG. 12 is a front view corresponding to FIG. 7, and the first fixing portion 110 and the first adjusting portion 114 of the first roller 62 are omitted in the cam mechanism 134. In the fourth modification, the P-removal due to the retraction of the lock member 42 is suppressed from occurring based on the sliding friction of the second fixing portion 112 provided on the second roller 64. Further, since the second adjusting portion 116 provided on the second roller 64 adjusts the phase of the second roller 64, the effect of suppressing the P-removal with the second fixing portion 112 can be appropriately obtained.

Figure 13:
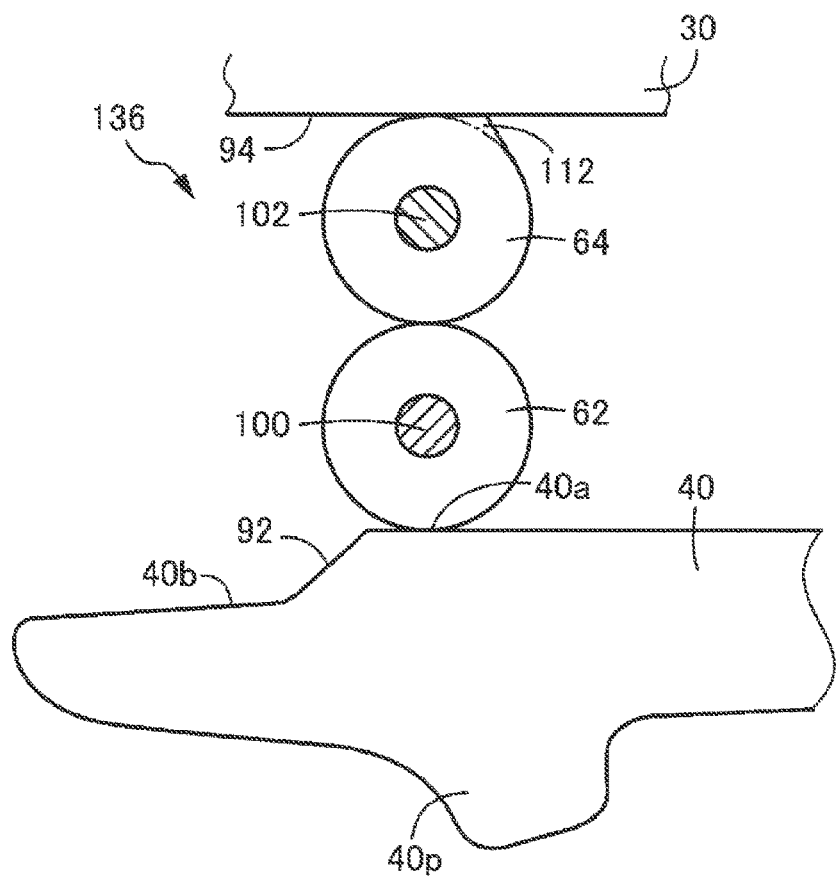
FIG. 13 is a front view illustrating an example in which a second adjusting portion of the second roller is omitted in the fourth modification in FIG. 12 as a fifth modification of the present embodiment.

Next, the fifth modification of the embodiment will be described. In the cam mechanism 136 in FIG. 13, the second adjusting portion 116 of the second roller 64 is omitted as compared with the fourth modification in FIG. 12. In the fifth modification, although the phase adjusting effect of the second roller 64 by the second adjusting portion 116 cannot be obtained, the sliding friction of the second fixing portion 112 suppresses the P-removal due to the retraction of the lock member 42 from occurring.

Figure 14:
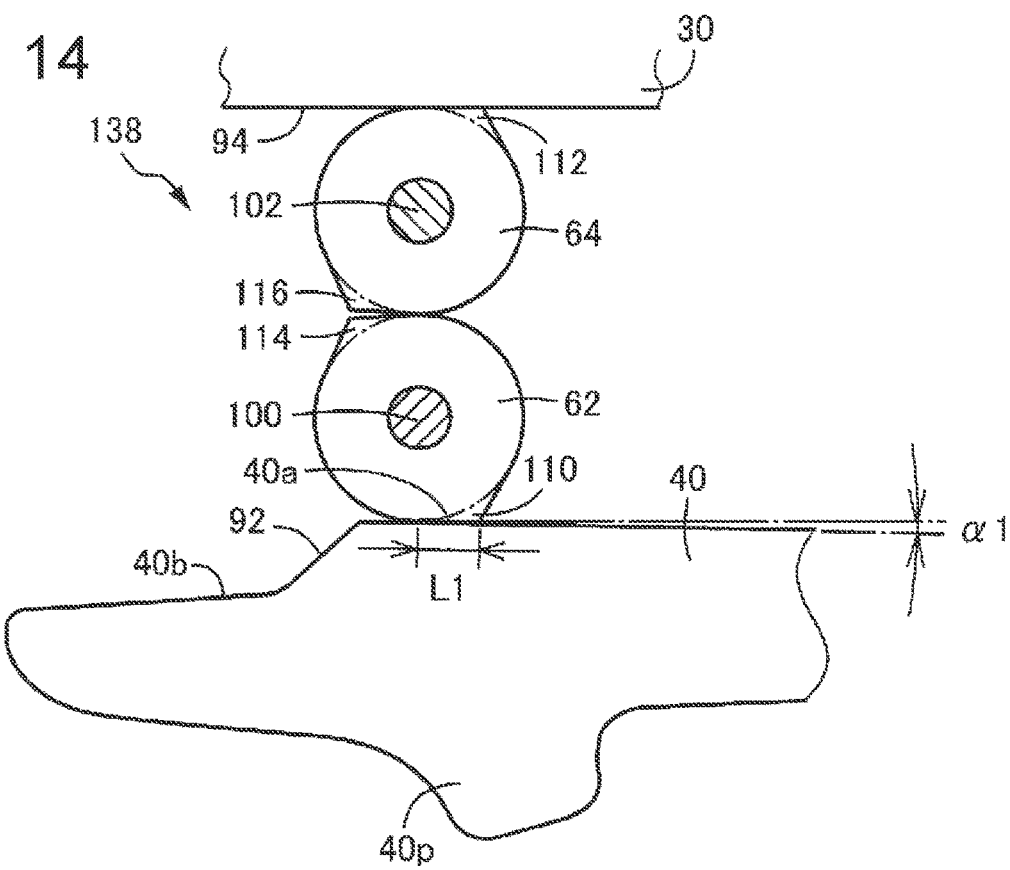
FIG. 14 is diagram illustrating an example in which a lock-side engaging surface of the parking pawl that is brought into contact with a first fixing portion of the first roller is inclined in a direction away from the guide member toward the lock position side as a sixth modification of the present embodiment, and is a front view corresponding to FIG. 7.

Next, the sixth modification of the embodiment will be described. FIG. 14 is a front view corresponding to FIG. 7, and in the cam mechanism 138, the lock-side engaging surface 40a provided on the parking pawl 40 is inclined at an inclination angle α1 with respect to a straight line parallel to the moving direction of the lock member 42 so as to be separated from the support member 30 toward the lock position (in the right direction in FIG. 14) in the parking lock state. In the parking lock state, the first fixing portion 110 provided on the first roller 62 is brought into contact with the inclined lock-side engaging surface 40a over the engaging length L1. In this case, the lock-side engaging surface 40a being pressed against the first roller 62 by the pushing load generates torque in the first roller 62 in the clockwise direction in FIG. 14, that is, torque causing the first roller 62 to roll in the direction toward the lock position side. When the lock member 42 attempts to move to the unlock position side (in the left direction in FIG. 14), the parking pawl 40 needs to be pushed back to the parking gear 44 side due to the inclination of the lock-side engaging surface 40a, which hinders the movement of the lock member 42 toward the unlock position side, and the P-removal is more appropriately suppressed. When the inclination angle α1 becomes large, a large operating force is required during the P-removal operation in which the shift lever 12 is shifted from the P position to the non-P position to move the lock member 42 from the lock position to the unlock position. Thus, the inclination angle α1 is appropriately determined in consideration of the P-removal operation.

Next, the seventh modification of the embodiment will be described. In the cam mechanism 140 in FIG. 15, contrary to the cam mechanism 138 in FIG. 14, the lock-side engaging surface 40a provided on the parking pawl 40 is inclined at an inclination angle α2 with respect to a straight line parallel to the moving direction of the lock member 42 so as to approach the support member 30 toward the lock position (in the right direction in FIG. 15) in the parking lock state. In the parking lock state, the first fixing portion 110 provided on the first roller 62 is brought into contact with the inclined lock-side engaging surface 40a over the engaging length L1. Also in the seventh modification, the P-removal due to the retraction of the lock member 42 is suppressed from occurring due to the sliding friction of the first fixing portion 110 and the second fixing portion 112. However, the inclination of the lock-side engaging surface 40a makes it easier for the lock member 42 to move to the unlock position side (in the left direction in FIG. 15), and thus the inclination angle α2 is appropriately determined within a range in which the retraction of the lock member 42 is suppressed.

Figure 16:
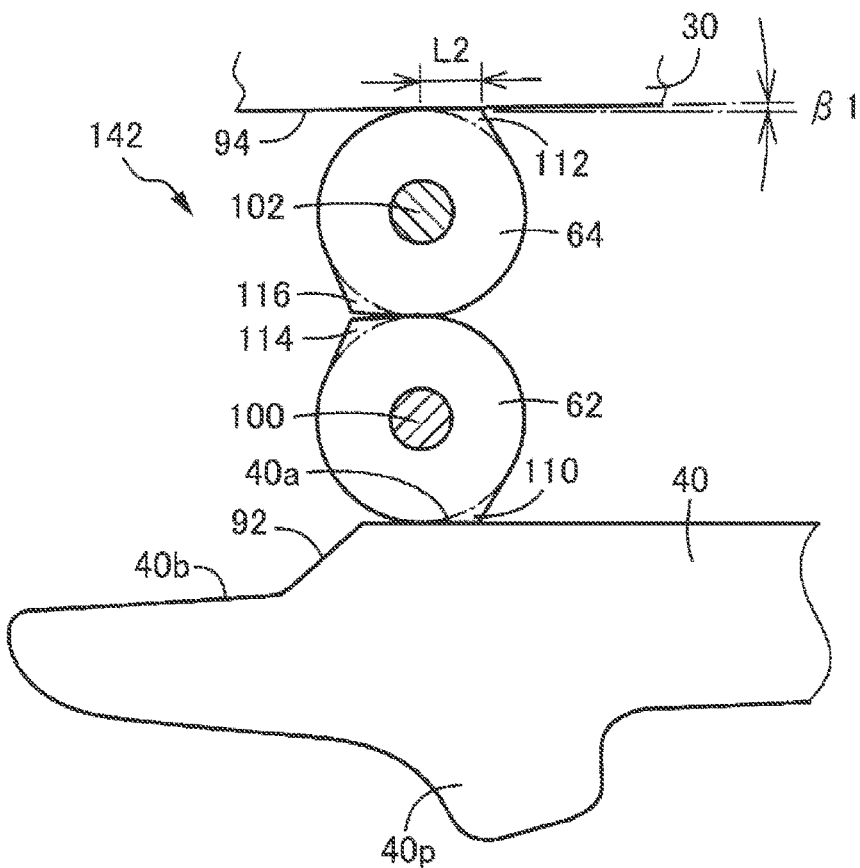
FIG. 16 is diagram illustrating an example in which the guide surface that is brought into contact with the second roller is inclined in a direction away from the parking pawl toward the lock position side as an eighth modification of the present embodiment, and is a front view corresponding to FIG. 7.

Next, the eighth modification of the embodiment will be described. FIG. 16 is a front view corresponding to FIG. 7, and in the cam mechanism 142, the guide surface 94 is inclined at an inclination angle 131 with respect to a straight line parallel to the moving direction of the lock member 42 so as to be separated from the parking pawl 40 toward the lock position (in the right direction in FIG. 16). The second fixing portion 112 provided on the second roller 64 is brought into contact with the inclined guide surface 94 over the engaging length L2 in the parking lock state. In this case, the second roller 64 being pressed against the guide surface 94 by the pushing load generates torque in the second roller 64 in the counterclockwise direction in FIG. 16, that is, torque causing the second roller 64 to roll in the direction toward the lock position side. When the lock member 42 attempts to move to the unlock position side (in the left direction in FIG. 16), the parking pawl 40 needs to be pushed back to the parking gear 44 side due to the inclination of the guide surface 94, which hinders the movement of the lock member 42 to the unlock position side, and the P-removal is more appropriately suppressed. When the inclination angle 131 becomes large, a large operating force is required during the P-removal operation in which the shift lever 12 is shifted from the P position to the non-P position to move the lock member 42 from the lock position to the unlock position. Thus, the inclination angle 131 is appropriately determined in consideration of the P-removal operation.

Next, the ninth modification of the embodiment will be described. In the cam mechanism 144 in FIG. 17, contrary to the cam mechanism 142 in FIG. 16, the guide surface 94 is inclined at an inclination angle 132 with respect to a straight line parallel to the moving direction of the lock member 42 so as to approach the parking pawl 40 toward the lock position (in the right direction in FIG. 17). In the parking lock state, the second fixing portion 112 provided on the second roller 64 is brought into contact with the inclined guide surface 94 over the engaging length L2. Also in the ninth modification, the P-removal due to the retraction of the lock member 42 is suppressed from occurring due to the sliding friction of the first fixing portion 110 and the second fixing portion 112. However, the inclination of the guide surface 94 makes it easier for the lock member 42 to move toward the unlock position side (in the left direction in FIG. 17), and thus the inclination angle (32 is appropriately determined within a range in which the retraction of the lock member 42 is suppressed.

Figure 18:
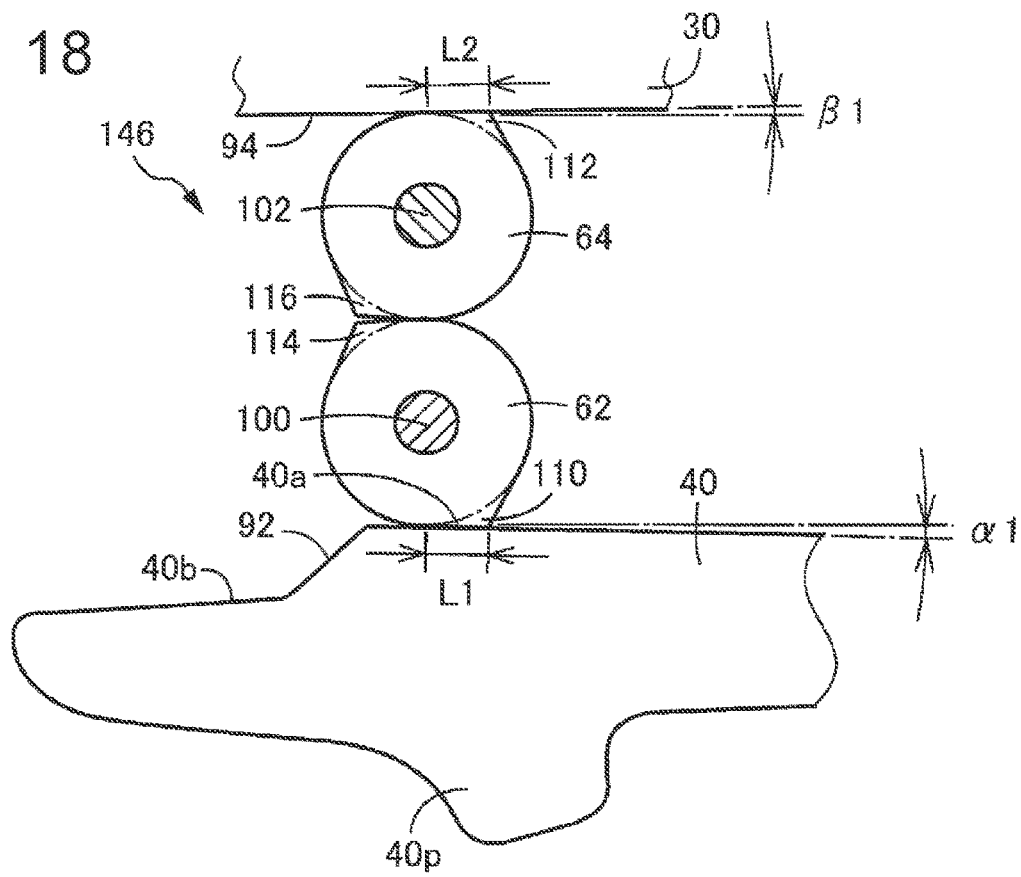
FIG. 18 is diagram illustrating an example in which the lock-side engaging surface of the parking pawl that is brought into contact with the first fixing portion of the first roller and the guide surface that is engaged with the second roller are each inclined in a direction away from each other toward the lock position side as a tenth modification of the present embodiment, and is a front view corresponding to FIG. 7.

Next, the tenth modification of the embodiment will be described. The cam mechanism 146 in FIG. 18 shows a combination of the mechanisms in FIG. 14 and FIG. 16. The lock-side engaging surface 40a provided on the parking pawl 40 is inclined at the inclination angle α1 with respect to a straight line parallel to the moving direction of the lock member 42 so as to be separated from the support member 30 toward the lock position (in the right direction in FIG. 18), and the guide surface 94 is inclined at the inclination angle 131 with respect to a straight line parallel to the moving direction of the lock member 42 so as to be separated from the parking pawl 40 toward the lock position. With this configuration, the same effect as those in FIGS. 14 and 16 can be obtained.

Figure 19:
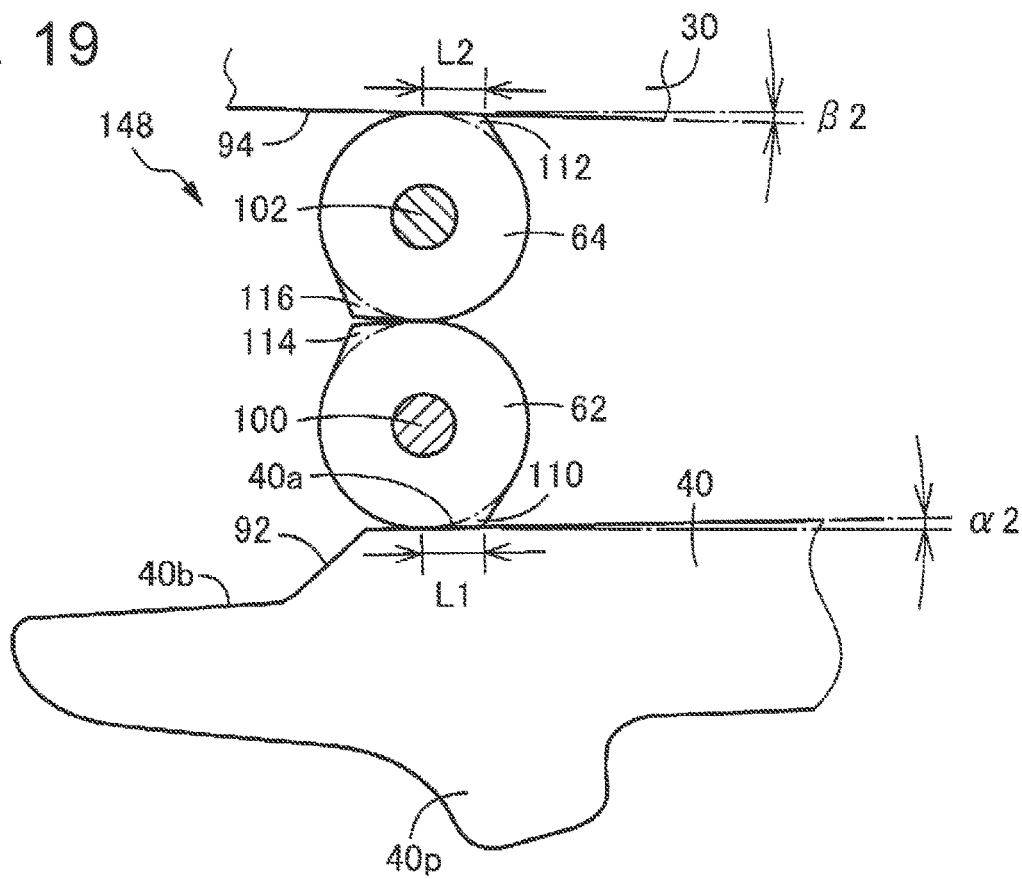
FIG. 19 is diagram illustrating an example in which the lock-side engaging surface of the parking pawl that is brought into contact with the first fixing portion of the first roller and the guide surface that is engaged with the second roller are each inclined in a direction closer to each other toward the lock position side as an eleventh modification of the present embodiment, and is a front view corresponding to FIG. 7.

Next, the eleventh modification of the embodiment will be described. The cam mechanism 148 in FIG. 19 shows a combination of the mechanisms in FIG. 15 and FIG. 17. The lock-side engaging surface 40a provided on the parking pawl 40 is inclined at the inclination angle α2 with respect to a straight line parallel to the moving direction of the lock member 42 so as to approach the support member 30 toward the lock position (in the right direction in FIG. 19), and the guide surface 94 is inclined at the inclination angle 132 with respect to a straight line parallel to the moving direction of the lock member 42 so as to approach the parking pawl 40 toward the lock position. With this configuration, the same effect as those in FIGS. 15 and 17 can be obtained.

Figure 15:
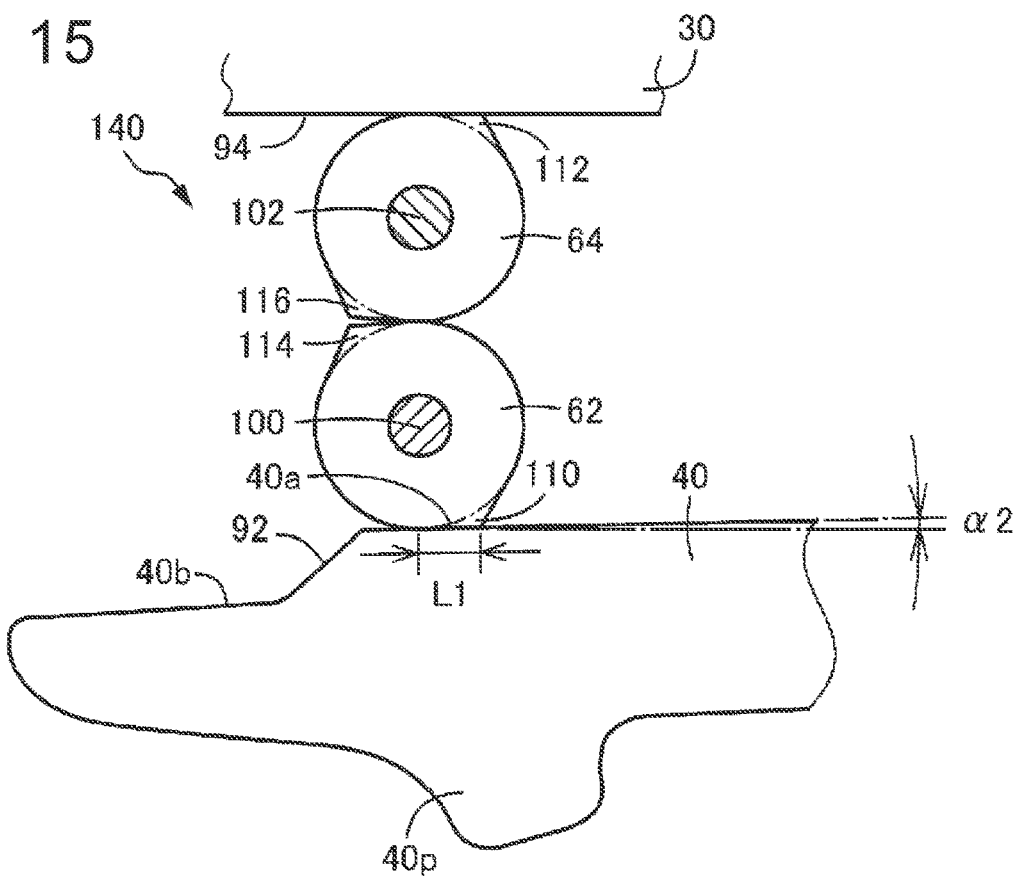
FIG. 15 is diagram illustrating an example in which the lock-side engaging surface of the parking pawl that is brought into contact with the first fixing portion of the first roller is inclined in a direction closer to the guide member toward the lock position side as a seventh modification of the present embodiment, and is a front view corresponding to FIG. 7.
Figure 17:
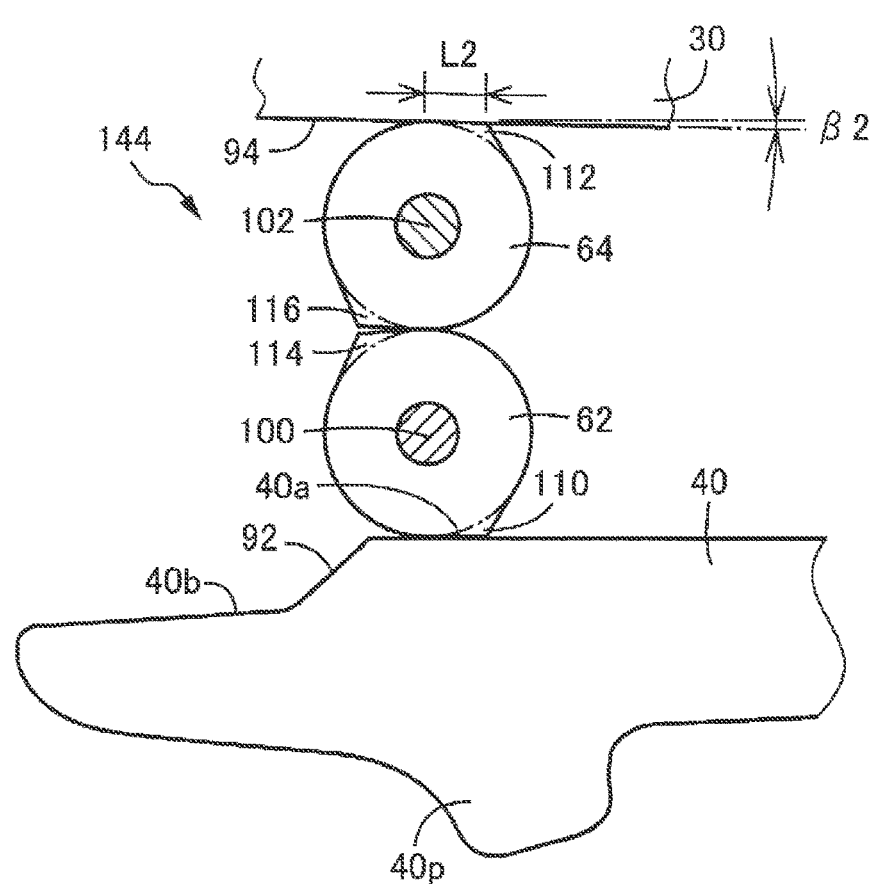
FIG. 17 is diagram illustrating an example in which the guide surface that is brought into contact with the second roller is inclined in a direction closer to the parking pawl toward the lock position side as a ninth modification of the present embodiment, and is a front view corresponding to FIG. 7.

Note that, FIG. 14 and FIG. 17 may be combined, or FIG. 15 and FIG. 16 may be combined. Various modes can be implemented, such as applying the techniques in FIGS. 10 and 11 to the modifications in FIGS. 14 and 15, applying the techniques in FIGS. 12 and 13 to the modifications in FIGS. 16 and 17, and applying the technique in FIG. 9 to the modifications in FIGS. 10 to 19.

Figure 20:
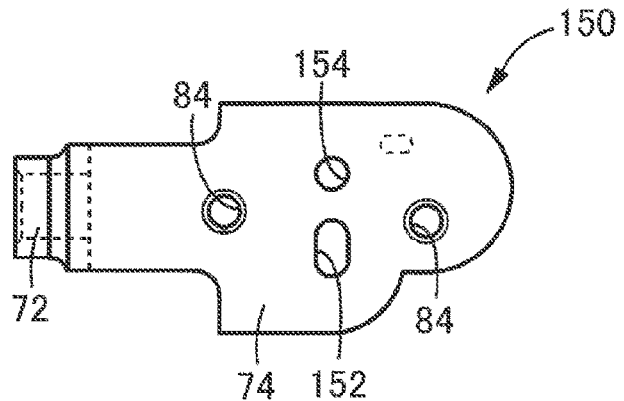
FIG. 20 is a diagram illustrating an example of the connecting head of the lock member as a twelfth modification of the present embodiment, and is a front view corresponding to FIG. 4.
Figure 21:
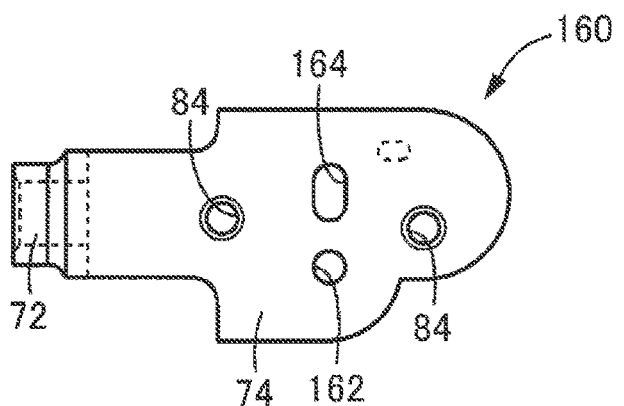
FIG. 21 is a diagram illustrating the connecting head of the lock member as a thirteenth modification of the present embodiment, and is a front view corresponding to FIG. 4.
Figure 22:
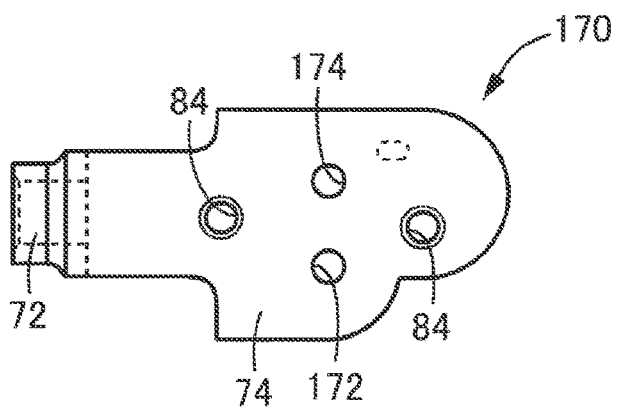
FIG. 22 is a diagram illustrating an example of the connecting head of the lock member as a fourteenth modification of the present embodiment, and is a front view corresponding to FIG. 4.

Further, in each of the above modifications, the mounting pins 100 and 102 of the pair of the first roller 62 and the second roller 64 are supported by the shared oval roller mounting holes 80 provided in the pair of side wall portions 74 of the connecting head 60. However, as in connecting heads 150, 160, 170 shown in FIGS. 20 to 22 corresponding to FIG. 4, mounting holes 152, 162, and 172 for the mounting pin 100 of the first roller 62 and mounting holes 154, 164, and 174 for the mounting pin 102 of the second roller 64 may be provided separately. In FIG. 20 in the twelfth modification of the embodiment, the oval mounting hole 152 for the first roller 62 enables the first roller 62 to be displaced vertically and to be brought into rolling contact with the outer peripheral surface of the second roller 64 supported at a fixed position by the circular mounting hole 154. In FIG. 21 in the thirteenth modification of the embodiment, the oval mounting hole 164 for the second roller 64 enables the second roller 64 to be displaced vertically and to be brought into rolling contact with the outer peripheral surface of the first roller 62 supported at a fixed position by the circular mounting hole 162. FIG. 22 in the fourteenth modification of the embodiment assumes a case where the first roller 62 and the second roller 64 are both supported at fixed positions by the circular mounting holes 172 and 174, and the positions of the mounting holes 172 and 174 are determined so that the outer peripheral surfaces of the first roller 62 and the second roller 64 are brought into rolling contact with each other.

As explained above, the vehicle parking lock mechanism of the present disclosure is applied to the manually operated parking lock mechanism in which the shift range is mechanically switched by, for example, the shift lever via the interlocking device such as the link or the cable. The vehicle parking lock mechanism of the present disclosure can also be applied to a shift-by-wire (SBW) parking lock mechanism in which the shift range selected by the shift range selection device such as the shift lever is electrically established by the electric shift actuator or the hydraulic shift actuator or the like. The shift range has at least the parking (P) range for parking that shuts off power transmission and mechanically hinders the rotation of the output shaft, and when the P range is selected, the parking lock mechanism is brought into the parking lock state. In addition to the P range, there are, for example, the drive (D) range that allows traveling forward and the reverse (R) range that allows traveling backward. The vehicle can be applied to various vehicles such as an engine-driven vehicle that generates power by burning fuel, an electric vehicle driven by an electric motor, or a hybrid vehicle having a plurality of power sources.

The parking gear is provided on the rotating shaft (output shaft, etc.) that is mechanically rotated as the wheel rotates, and when the parking pawl is engaged with the parking gear, the rotation of the rotating shaft and further, the rotation of the wheel are mechanically hindered. The lock member is provided at the tip portion of the parking rod, for example, is reciprocated to the lock position and the unlock position together with the parking rod, and can be retracted to the unlock position side by an urging device such as a spring member.

The pair of first and second rollers constituting the cam mechanism is non-displaceably mounted to the lock member via, for example, mounting pins, but can also be provided on the lock member so as be displaceable in a direction perpendicular to the moving direction of the lock member, that is, in a direction closer to and away from the parking pawl and the guide member. Various modes can be implemented, for example, the mounting pins may be engaged with an elongated hole of the lock member so as to be displaceable, or the lock member itself may be displaceable in a direction perpendicular to the moving direction.

When the first fixing portion is provided on the first roller, the lock-side engaging surface of the parking pawl with which the first fixing portion is brought into contact in the parking lock state is provided so as to be parallel to, for example, the moving direction of the lock member. However, it is also possible to incline the lock-side engaging surface in a direction away from the guide member, or conversely in a direction closer to the guide member, toward the lock position side. That is, the rotational resistance of the first roller increases based on the sliding friction generated between the first fixing portion and the lock-side engaging surface, and the lock-side engaging surface can be inclined in consideration of the friction coefficient and the dimensional variation of each part as long as P-removal is suppressed from occurring.

When the second fixing portion is provided on the second roller, the guide surface with which the second fixing portion is brought into contact in the parking lock state is provided so as to be parallel to, for example, the moving direction of the lock member. However, it is also possible to incline the guide surface in a direction away from the parking pawl or conversely in a direction closer to the parking pawl toward the lock position side. That is, the rotational resistance of the second roller increases based on the sliding friction generated between the second fixing portion and the guide surface, and the guide surface can be inclined in consideration of the friction coefficient and the dimensional variation of each part as long as P-removal is suppressed from occurring. The main portion of the guide surface, that is, the portion that is engaged with the cylindrical surface of the second roller when the lock member is moved between the lock position and the unlock position, may be provided, for example, parallel to the moving direction of the lock member, and only the portion that the second fixing portion is brought into contact with when the lock member is moved to the lock position may be inclined at a predetermined angle.

At least one of the first fixing portion and the second fixing portion needs to be provided. The first adjusting portion and the second adjusting portion, and the first gear and the second gear may be provided as necessary. It is also possible to provide the first gear and the second gear in addition to the first adjusting portion and the second adjusting portion. That is, if the phase shift of the first roller and the second roller is large, the phase adjustment by the first adjusting portion and the second adjusting portion may not be performed appropriately. In this case, synchronous rotation of the first gear and the second gear suppresses a large phase shift between the first roller and the second roller, enabling fine phase adjustment to be appropriately performed by the first adjusting portion and the second adjusting portion, and the effect of suppressing the P-removal from occurring with the first fixing portion and the second fixing portion can be obtained more appropriately.

Although the embodiment of the present disclosure and the modifications thereof have been described in detail with reference to the drawings, the above description is merely an example, and the present disclosure can be implemented in various modified and improved modes based on the knowledge of those skilled in the art.

What is claimed is:

1. A vehicle parking lock mechanism comprising:
    a parking gear;
    a parking pawl that is provided so as to be brought closer to and separated from the parking gear and that is configured to hinder rotation of the parking gear by being engaged with the parking gear;
    a lock member that is provided so as to be reciprocally movable between a lock position and an unlock position and that is configured to, then the lock member is moved to the lock position, bring the parking pawl closer to the parking gear via a cam mechanism such that the lock member is moved to the lock position to establish a parking lock state in which the parking pawl hinders rotation of the parking gear; and
    a guide member provided on an opposite side of the parking pawl with respect to the lock member put between the guide member and the parking pawl and including a guide surface configured to guide movement of the lock member between the lock position and the unlock position while restricting the lock member from displacing in a direction away from the parking pawl, wherein the cam mechanism includes a pair of a first roller and a second roller provided on the lock member such that the first roller and the second roller are rotatable around axes perpendicular to a moving direction of the lock member and parallel to each other, and outer peripheral surfaces are brought into rolling contact with each other, wherein, when the lock member is moved from the unlock position to the lock position, the first roller is configured to be engaged with a cam surface provided on the parking pawl so as to bring the parking pawl closer to the parking gear to be engaged with the parking gear and the second roller is configured to be engaged with the guide surface so as to restrict the lock member from displacing in the direction away from the parking pawl, and wherein the outer peripheral surface of at least one of the first roller and the second roller includes a fixing portion that in the parking lock state protrudes toward the lock position and is brought into contact with the parking pawl or the guide surface over a predetermined engaging length.

2. The vehicle parking lock mechanism according to claim 1, wherein the outer peripheral surface of the first roller includes, as the fixing portion, a first fixing portion that protrudes toward the lock position and is brought into contact with the parking pawl over the predetermined engaging length of the first fixing portion in the parking lock state.

3. The vehicle parking lock mechanism according to claim 2, wherein in the parking lock state a lock-side engaging surface of the parking pawl with which the first fixing portion is brought into contact is inclined in a direction away from the guide member toward a lock position side with respect to a straight line parallel to the moving direction of the lock member.

4. The vehicle parking lock mechanism according to claim 2, wherein the outer peripheral surface of the first roller includes a first adjusting portion that, in an unlock state in which the lock member is moved to the unlock position, protrudes toward the unlock position and is brought into contact with the parking pawl over a predetermined engaging length of the first adjusting portion.

5. The vehicle parking lock mechanism according to claim 1, wherein the outer peripheral surface of the second roller includes, as the fixing portion, a second fixing portion that in the parking lock state protrudes toward the lock position and is brought into contact with the guide surface over the predetermined engaging length of the second fixing portion.

6. The vehicle parking lock mechanism according to claim 5, wherein the guide surface with which the second fixing portion is brought into contact is inclined in the direction away from the parking pawl toward a lock position side with respect to a straight line parallel to the moving direction of the lock member.

7. The vehicle parking lock mechanism according to claim 5, wherein the outer peripheral surface of the second roller includes a second adjusting portion that, in an unlock state in which the lock member is moved to the unlock position, protrudes toward the unlock position and is brought into contact with the guide surface over a predetermined engaging length of the second adjusting portion.

8. The vehicle parking lock mechanism according to claim wherein:

the outer peripheral surface of the first roller includes, as the fixing portion, a first fixing portion that in the parking lock state protrudes toward the lock position and is brought into contact with the parking pawl over the predetermined engaging length of the first fixing portion; and the outer peripheral surface of the second roller includes, as the fixing portion, a second fixing portion that in the parking lock state protrudes toward the lock position and is brought into contact with the guide surface over the predetermined engaging length of the second fixing portion.

9. The vehicle parking lock mechanism according to claim 8, wherein:

the outer peripheral surface of the first roller includes a first adjusting portion that, in an unlock state in which the lock member is moved to the unlock position, protrudes toward the unlock position and is brought into contact with the parking pawl over a predetermined engaging length of the first adjusting portion; and the outer peripheral surface of the second roller includes a second adjusting portion that in the unlock state protrudes toward the unlock position and is brought into contact with the guide surface over a predetermined engaging length of the second adjusting portion.

10. The vehicle parking lock mechanism according to claim 8, wherein the first roller and the second roller are provided with a first gear and a second gear so as not to be rotatable with respect to the first gear and the second gear, respectively, the first gear and the second gear being configured to mesh with each other such that the first roller and the second roller are synchronously rotated in a predetermined phase.

* * * * *